United States Patent
Yamamoto

(10) Patent No.: US 7,698,300 B2
(45) Date of Patent: Apr. 13, 2010

(54) INFORMATION PROCESSING APPARATUS, METHOD AND PROGRAM

(75) Inventor: Noriyuki Yamamoto, Kanagawa (JP)

(73) Assignee: SONY Corporation, Tokyo (JP)

( * ) Notice: Subject to any disclaimer, the term of this patent is extended or adjusted under 35 U.S.C. 154(b) by 370 days.

(21) Appl. No.: 11/338,642

(22) Filed: Jan. 25, 2006

(65) Prior Publication Data

US 2006/0190464 A1      Aug. 24, 2006

(30) Foreign Application Priority Data

Feb. 1, 2005      (JP) ............................. P2005-025298

(51) Int. Cl.
    G06F 7/00      (2006.01)
    G06F 17/00     (2006.01)
(52) U.S. Cl. .................................. 707/104.1
(58) Field of Classification Search ............ None
    See application file for complete search history.

(56) References Cited

U.S. PATENT DOCUMENTS

| | | | |
|---|---|---|---|
| 5,758,257 A * | 5/1998 | Herz et al. ................. 725/116 |
| 7,035,873 B2 * | 4/2006 | Weare ..................... 707/104.1 |
| 7,081,579 B2 * | 7/2006 | Alcalde et al. ................ 84/608 |
| 7,089,217 B2 * | 8/2006 | Kasabov ...................... 706/12 |
| 7,268,288 B2 * | 9/2007 | Yamane et al. ................ 84/615 |
| 7,289,157 B2 * | 10/2007 | Briand et al. ............... 348/441 |
| 7,321,899 B2 * | 1/2008 | Saito et al. .................. 707/102 |
| 2003/0105589 A1 * | 6/2003 | Liu et al. ....................... 702/1 |
| 2003/0221541 A1 * | 12/2003 | Platt ............................ 84/609 |
| 2006/0047678 A1 * | 3/2006 | Miyazaki et al. ............ 707/102 |
| 2006/0173910 A1 * | 8/2006 | McLaughlin ............. 707/104.1 |
| 2008/0071832 A1 * | 3/2008 | Sugiura et al. ........... 707/104.1 |
| 2008/0189330 A1 * | 8/2008 | Hoos et al. ............... 707/104.1 |
| 2009/0150445 A1 * | 6/2009 | Herberger et al. ........ 707/104.1 |

FOREIGN PATENT DOCUMENTS

JP      2004-194107      7/2004

OTHER PUBLICATIONS

Cesarini et al., "Retrieval by Layout Similarity of Documents Represented with MXY Trees", 2002, Springer-Verlag Berlin Heidelberg, pp. 353-364.*

Pauws et al., "PATS: Realization and User Evaluation of an Automatic Playlist Generator," IRCAM, 2002.*

* cited by examiner

*Primary Examiner*—Pierre M Vital
*Assistant Examiner*—Rachel J Lee
(74) *Attorney, Agent, or Firm*—Finnegan, Henderson, Farabow, Garrett & Dunner LLP

(57) ABSTRACT

If content having an attribute different from that of content usually used by a user is selected, the present invention allows proper content recommendation in accordance with the selection. When notified from a control block of a selected piece of music, a short-term preference vector generation block gets music vector of that piece of music from a music vector storage block and stores obtained music vector into a short-term preference vector storage block as short-term preference vector. A recommendation block computes a difference between short-term preference vector and long-term preference vector and, by use of a weight based on the computed difference, determines a piece of music to be recommended to a user, thereby recommending the determined piece of music to the user.

12 Claims, 20 Drawing Sheets

| ATTRIBUTE | MOOD |
|---|---|
| ⋮ | ⋮ |
| QUICK TEMPO | BRIGHT |
| SLOW TEMPO | DARK |
| ⋮ | ⋮ |

FIG.20

| ATTRIBUTE | MOOD |
|---|---|
| ⋮ | ⋮ |
| ACTION, COMEDY | BRIGHT |
| LITERATURE | DARK |
| ⋮ | ⋮ |

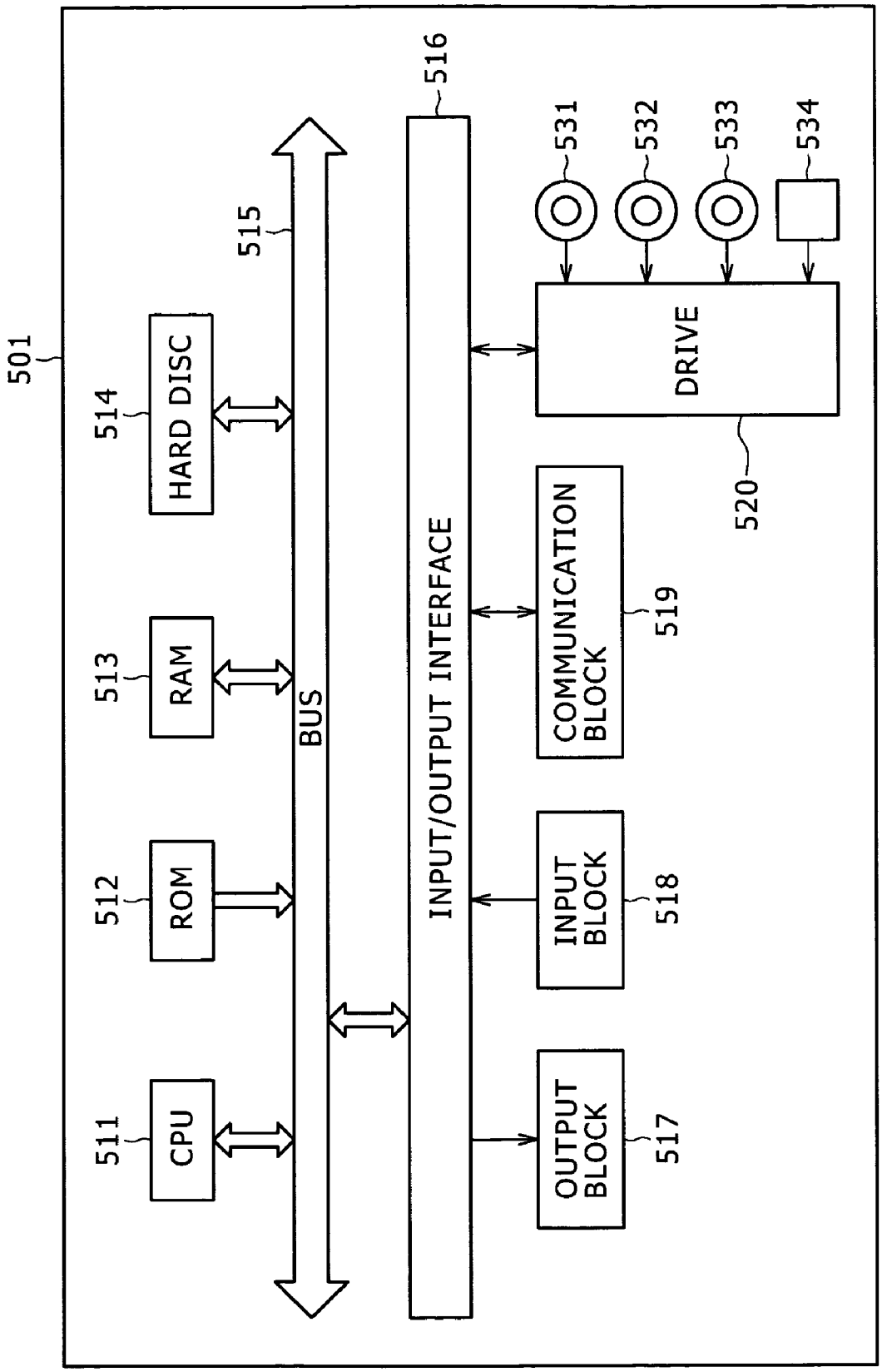

INFORMATION PROCESSING APPARATUS, METHOD AND PROGRAM

CROSS REFERENCES TO RELATED APPLICATIONS

The present invention contains subject matter related to Japanese Patent Application JP 2005-025298 filed in the Japanese Patent Office on Feb. 1, 2005, the entire contents of which being incorporated herein by reference.

BACKGROUND OF THE INVENTION

The present invention relates to an information processing apparatus, method and a program and, more particularly, to an information processing apparatus, method and a program that are adapted to properly recommend content to users.

Several methods have been developed in which television and radio programs or music data stored otherwise are recommended to users.

For example, there is a method in which a matching is provided between user preference information and attribute information of content providable to a user (genre, etc.) to recommend particular pieces of content having attributes that are near the user preference information.

For example, Japanese Patent Laid-Open No. 2004-194107 discloses a method in which user preference information is accumulated by use of n-th dimensional vectors according to content attributes and particular pieces of content are determined by use of the accumulated preference information.

Meanwhile, with the above-mentioned method in which matching is provided between user preference information and content attribute information, user preference information is generated on the basis of user's usage log (namely, the attribute information and so on of the content used by a user); normally, however, user preference information is generated on the basis of longer-term usage logs because, as usage logs span, a longer period, the more correctly generated will be user preference information.

In the above-mentioned situation, however, if a user who is in a different mood than usual selects a piece of music that is accordingly different in tune (for example, slow tempo) than usual (for example, quick tempo), this selection (or usage log) of music different from usual is not much reflected onto the user preference information, so that, in a next recommendation, the music of the tune (for example, quick tempo) usually listened to would be recommended as before.

SUMMARY OF THE INVENTION

If a user who is in a mood different from usual selects a piece of music having a tune (for example, slow tempo) different from a tune (for example, quick tempo) that the user usually listen to, it is supposed that this different moods continue for a certain period of time (for example, a period of time from turning on the power to a music reproduction device to turning off) (namely, the user wants to listen to the music of slow tempo) in general. However, in related-art methods, pieces of music having tunes that are usually listened to (quick tempo) are recommended again.

Therefore, it is difficult for related-art recommendation methods to make content recommendation that properly reflects the selection by a user of a particular piece of content having an attribute different from usual.

Consequently, present invention addresses the above-identified and other problems associated with related-art methods and apparatuses by making proper content recommendation in accordance with the selection by a user of a particular piece of content having an attribute different from usual.

In carrying out the invention and according to one embodiment thereof, there is provided a first information processing apparatus having short-term preference information generation means for generating short-term preference information from attribute information of content selected in a predetermined period and decision means for determining content to be recommended to a user by use of a difference between the long-term preference information and the short-term preference information.

In the above-mentioned first information processing apparatus, the decision means may have: difference computation means for computing a difference between the long-term preference information and the short-term preference information; weight generation means for generating weight information on the basis of the difference computed by the difference computation means; similarity computation means for computing a similarity between the short-term preference information and the attribute information of content providable to a user by use of the weight information generated by the weight generation means; and content determination means for determining content to be recommended to a user on the basis of the similarity computed by the similarity computation means.

In the above-mentioned first information processing apparatus, the long-term preference information and the short-term preference information are each made up of information indicative of content attributes, the difference computation means computes a similarity for each of the attributes, and the weight generation means may generate a weight such that a weight corresponding to an attribute smaller in the similarity than a reference value is greater.

In the above-mentioned first information processing apparatus, every time content may be selected during the period, the reference value may be changed from a larger value to a smaller value.

In the above-mentioned first information processing apparatus, the weight generation means may generate a weight such that a weight corresponding to an attribute having the similarity higher than the reference value and an attribute having the similarity lower than the reference value gets greater.

The above-mentioned first information processing apparatus further has a recommendation means for recommending the content determined by the decision means to a user wherein, if content other than the content recommended by the recommendation means is selected by a user, the decision means may exclude, from the content to be recommended, content having an attribute having a relatively large difference between attribute information of the selected content and one of long-term preference information and short-term preference information.

The above-mentioned first information processing apparatus further has communication means for communicating with a server holding content providable to a user and communication control means for transmitting the short-term preference information generated by the short-term preference information generation means and the weight information generated by the weight generation means to the server via the communication means if a difference between the long-term preference information and the short-term preference information is relatively large and acquiring, from the server, a similarity between the attribute information of the content held in the server, computed by use of the weight information, computed by the server, and the short-term preference information, wherein the content determination means may determine content to be recommended to a user on the basis of the acquired similarity acquired by the communication means.

In carrying out the invention and according to another embodiment thereof, there is provided a first information processing method having the steps of generating short-term preference information from attribute information of content selected in a predetermined period and determining content to be recommended to a user by use of a difference between the long-term preference information and the short-term preference information.

In carrying out the invention and according to still another embodiment thereof, there is provided a first program having the steps of generating short-term preference information from attribute information of content selected in a predetermined period and determining content to be recommended to a user by use of a difference between the long-term preference information and the short-term preference information.

In the above-mentioned first information processing apparatus, method, and program according to the invention, short-term preference information is generated from attribute information of content selected during a predetermined period and a difference between long-term preference information and short-term preference information is used to determine content to be recommended to users.

In carrying out the invention and according to yet another embodiment thereof, there is provided a second information processing apparatus having short-term preference information generation means for generating short-term preference information from attribute information indicative of an attribute of content selected during a predetermined period and control means for controlling the apparatus on the basis of a difference between the long-term preference information and the short-term preference information.

In the above-mentioned second information processing apparatus, the control means may have estimation means for estimating a mood of a user on the basis of a difference between long-term preference information and the short-term preference information and device control means for controlling an apparatus in accordance with a mood estimated by the estimation means.

The above-mentioned second information processing apparatus further has recommendation means for recommending predetermined content, wherein the control means may notify the recommendation means of the mood estimated by the estimation means and the recommendation means may recommend content corresponding to the mood notified by the control means.

In carrying out the invention and according to a different embodiment thereof, there is provided a second information processing method having the steps of generating short-term preference information from attribute information indicative of an attribute of content selected during a predetermined period and controlling the apparatus on the basis of a difference between the long-term preference information and the short-term preference information.

In carrying out the invention and according to a still different embodiment thereof, there is provided a second program having the steps of generating short-term preference information from attribute information indicative of an attribute of content selected during a predetermined period and controlling the apparatus on the basis of a difference between the long-term preference information and the short-term preference information.

According to the second information processing apparatus, method, and program, short-term preference information is generated from attribute information indicative of an attribute of content selected during a predetermined period and an apparatus is controlled on the basis of a difference between long-term preference information and short-term preference information.

According to the invention, if content having an attribute different from that of content usually used by a user is selected, the present invention allows proper content recommendation in accordance with the selection.

BRIEF DESCRIPTION OF THE DRAWINGS

The above and other objects, features and advantages of the present invention will become apparent from the following description of embodiments with reference to the accompanying drawings in which:

FIG. 20 is a schematic diagram illustrating an example of a table stored in a recommendation block 123 shown in FIG. 19; and FIG. 21 is a block diagram illustrating an exemplary configuration of a computer 501.

DETAILED DESCRIPTION OF THE PREFERRED EMBODIMENTS

This invention will be described in further detail by way of example with reference to the accompanying drawings. The invention described herein and the embodiments thereof have the following correlation. The description hereof is intended to make sure of the fact that the embodiments supporting the invention described herein are described herein. Therefore, if there is any embodiment that, although described in the description of the preferred embodiment, is not described herein as corresponding to the invention, this does not denote in any manner that such an embodiment does not corresponding to the present invention. Conversely, if any embodiment is described herein as corresponding to the invention, it does not denote in any manner that such an embodiment does not corresponding to other inventions than the present invention.

Further, the description hereof does not denote the entire invention described herein. In other words, the existence of any invention described herein and not claimed herein will not deny the existence of any inventions that may be filed as a divisional application, emerge as a result of amendment, or added hereto in the future.

Figure 2:
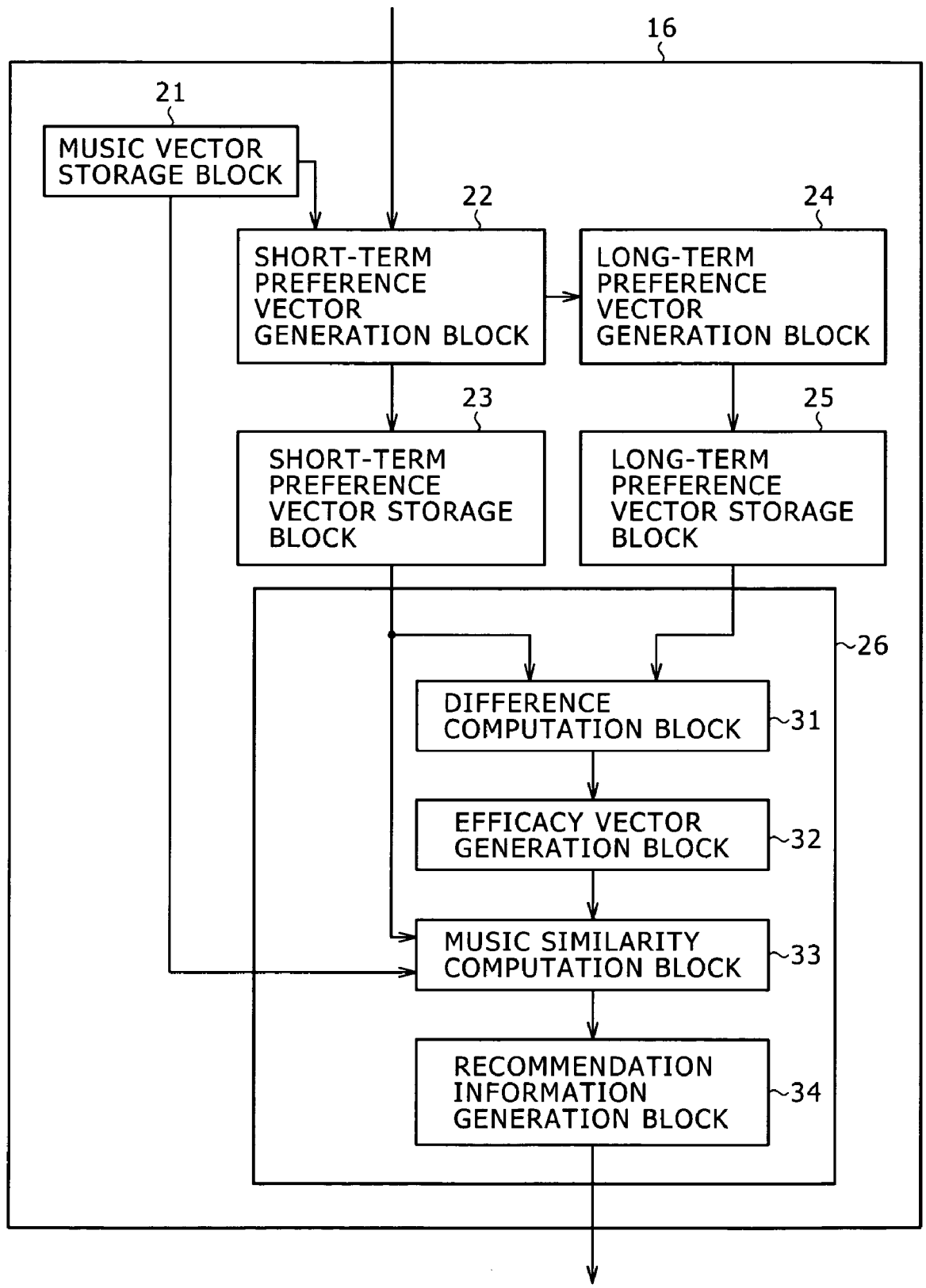
FIG. 2 is a block diagram illustrating an exemplary configuration of a recommendation block 16 shown in FIG. 1.

A first information processing apparatus practiced as one embodiment of the invention has short-term preference information generation means (for example, a short-term reference vector generation block 22 shown in FIG. 2) for generating short-term preference information from attribute information of content selected in a predetermined period of time and determination means (for example, a recommendation block 26 shown in FIG. 2) for determining a particular piece of content to be recommended to a user by use of a difference between long-term preference information and short-term preference information.

The determination means may have difference computation means (for example, a difference computation block 31 shown in FIG. 2) for computing a difference between long-term preference information and short-term preference information, weight generation means (for example, an efficacy vector generation block 32 shown in FIG. 2) for generating weight information on the basis of a difference obtained by the difference computation means, similarity computation means (for example, music similarity computation block 33) for computing similarity between short-term preference information and attribute information of content providable to users by use of the weight information generated by the weight generation means, and content determination means (for example, a recommendation information generation block 34 shown in FIG. 2) for determining content to be provided to users on the basis of similarity computed by the similarity computation means.

Long-term preference information and short-term preference information are each composed of information indicative of content attributes. The difference computation means computes similarity for each attribute (for example, step S23 shown in FIG. 4) and the weight generation means generates weight information such that the weight corresponding to an attribute smaller in similarity than a reference value (for example, variation highlighting coefficient r) gets greater (for example, step S24 and step S26 shown in FIG. 4).

Figure 7:
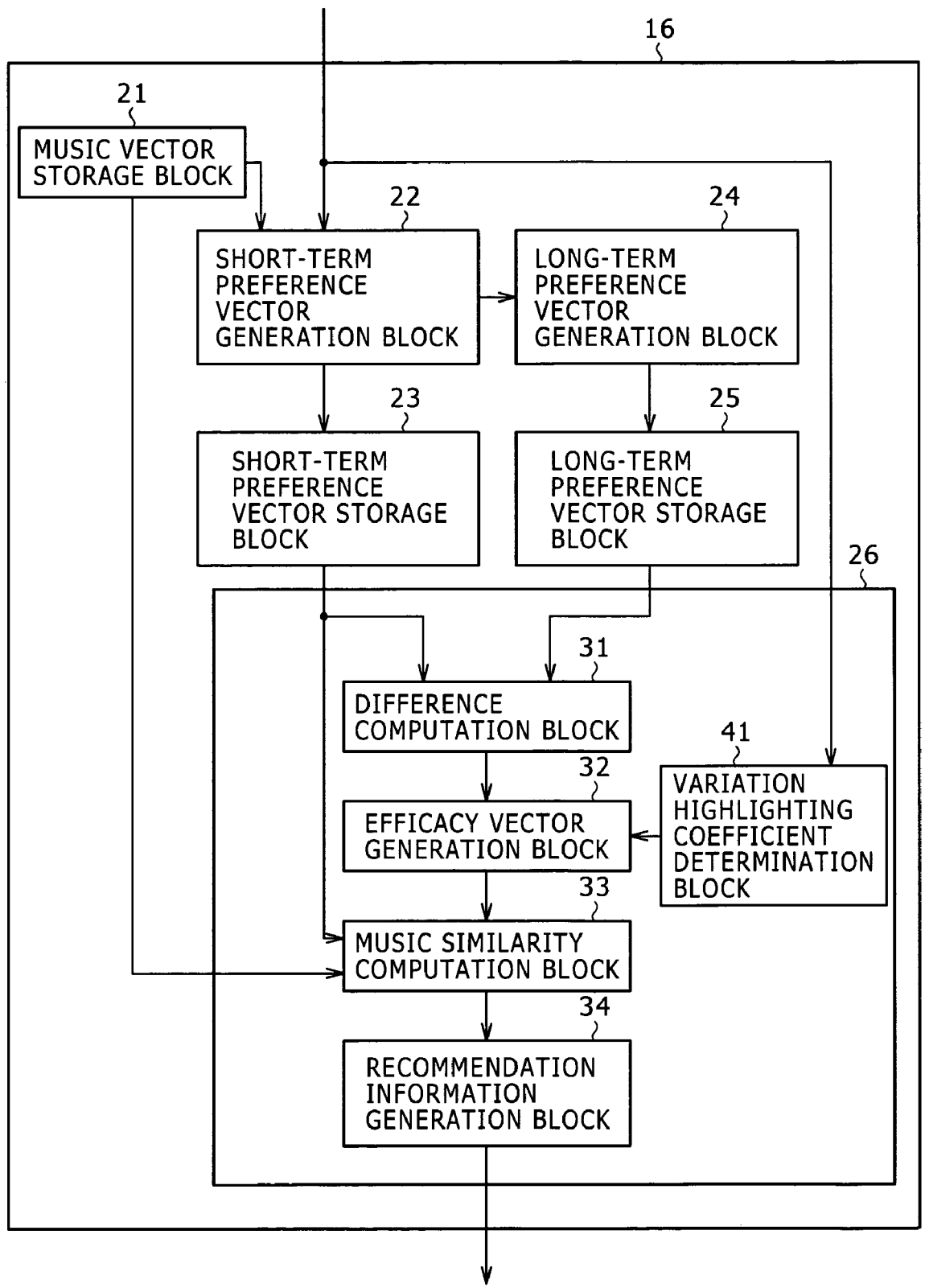
FIG. 7 is a block diagram illustrating another exemplary configuration the recommendation block 16 of the reproducing apparatus shown in FIG. 1.

Reference value change means (for example a variation highlighting coefficient determination block 41 shown in FIG. 7) for changing reference values from large to small every time content is selected during a period may also be arranged.

Figure 9:
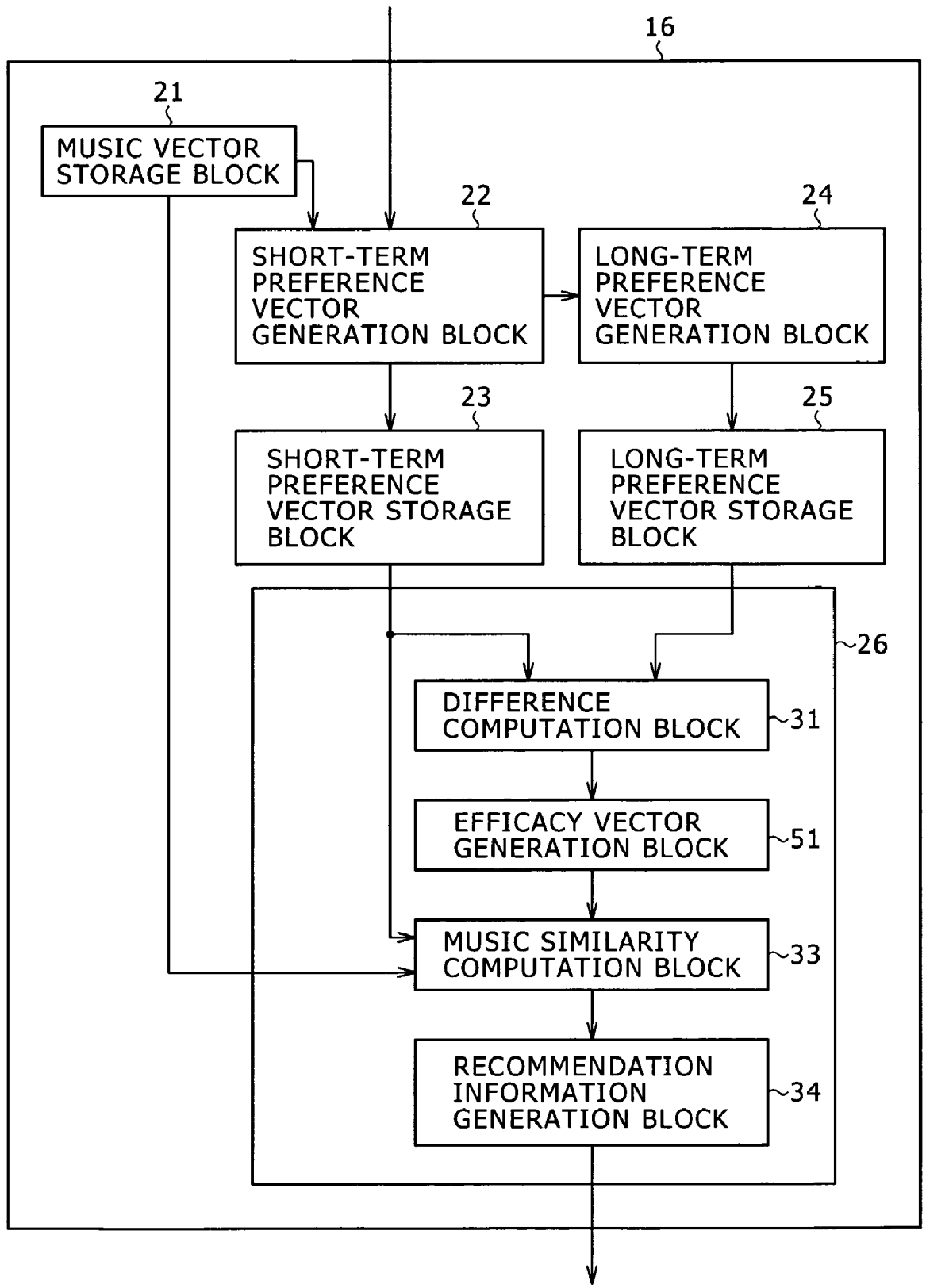
FIG. 9 is a block diagram illustrating still another exemplary configuration of the recommendation block 16 of the reproducing apparatus shown in FIG. 1.
Figure 10:
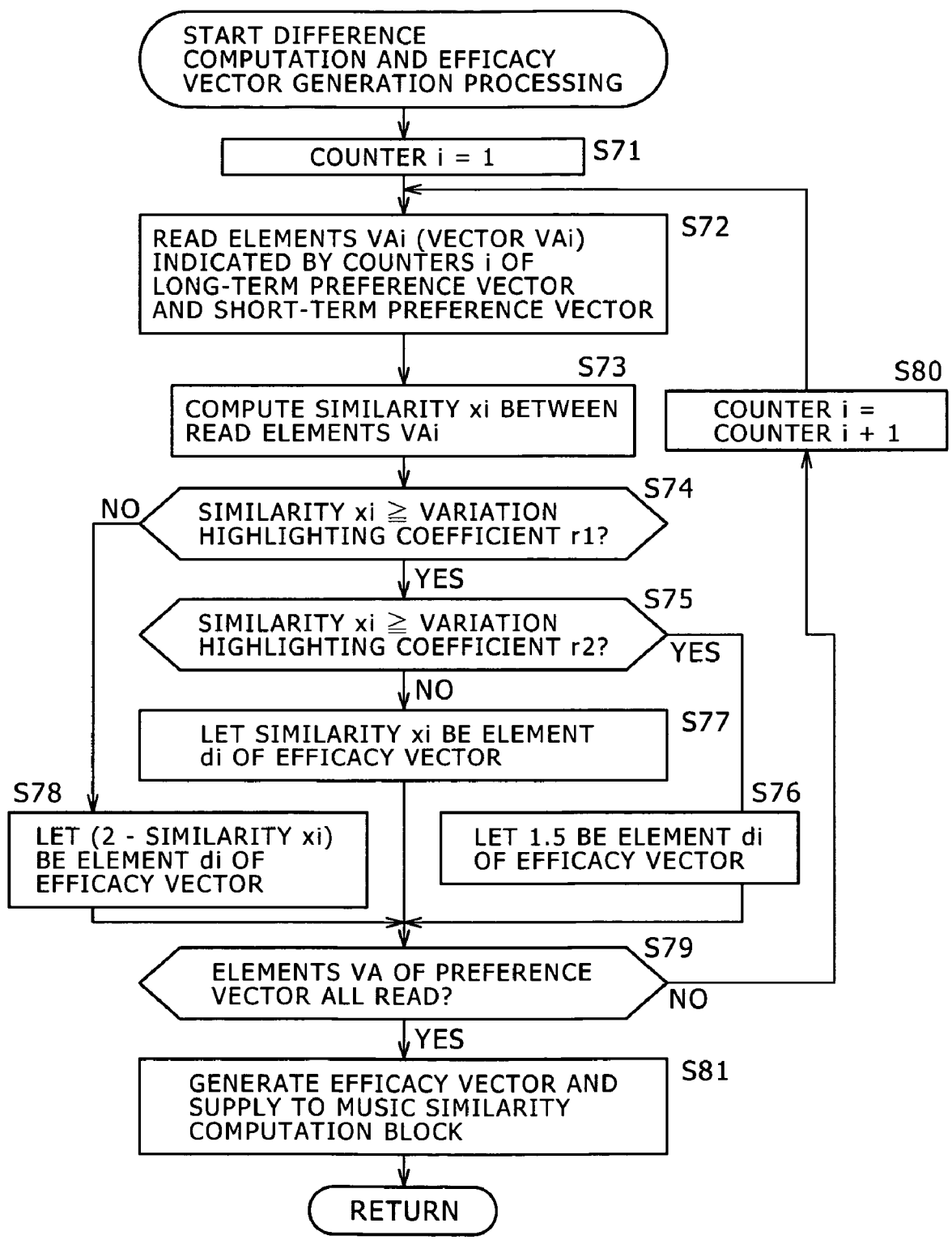
FIG. 10 is a flowchart indicative of still another recommendation processing operation of step S4 shown in FIG. 3.

The weight generation means (for example, an efficacy vector generation block 51 shown in FIG. 9) generates weight generation such that the weight corresponding to an attribute smaller in similarity than a reference value (for example, step S74 and step S78 shown in FIG. 10) and an attribute greater in similarity than the reference value (for example, step S75 and step S76 shown in FIG. 10) gets greater.

Figure 11:
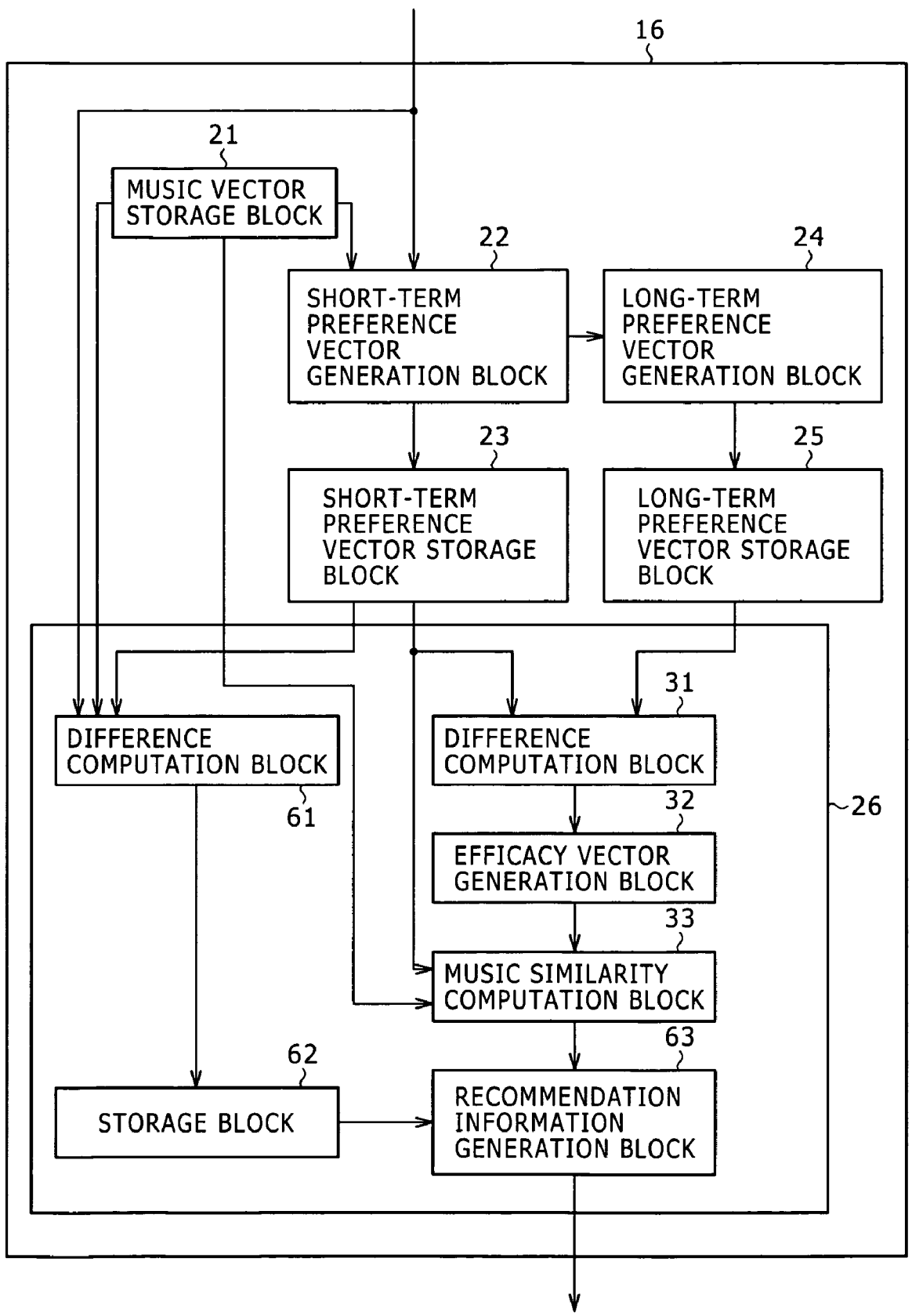
FIG. 11 is a block diagram illustrating yet another exemplary configuration of the recommendation block 16 of the reproducing apparatus shown in FIG. 1.

Recommendation means (for example, a recommendation information generation block 63 shown in FIG. 11) for recommending the content determined by the determination means to users is further arranged. If content other than that recommended by the recommendation means is selected by the user, the determination means (for example, the recommendation information generation block 63) excludes a particular piece of content having an attribute having a greater difference between the attribute information of the selected content and long-term preference information or short-term preference information from the content to be recommended (for example, step S96 and step S101 shown in FIG. 12).

The first information processing apparatus further has communication means (for example, a communication block 81 shown in FIG. 14) for communicating with a server (for example, a server 71 shown in FIG. 14) holding content providable to users and communication control means (for example, a control block 12 shown in FIG. 14) for transmitting, if a difference between long-term preference information and short-term preference information is great, the short-term preference information generated by the short-term preference information generation means and the weight information generated by the weight generation means to the server through the communication means to acquire, from the server, the similarity between the attribute information of the content held by the server-computed by the server by use of the weight information and the short-term preference information. Content determination means (for example, a recommendation block 16 shown in FIG. 14) determines the content to be recommended to the user on the basis of the similarity acquired through the communication means.

The first information processing method and the program practiced as embodiments of the invention include short-term preference information generation step (for example, step S3 shown in FIG. 3) for generating short-term preference information from the attribute information of the content selected during a predetermined period of time and determination step (for example, step S4 through step S6 shown in FIG. 3) for determining the content to be recommended to the user by use of the difference between long-term preference information and short-term preference information.

Figure 16:
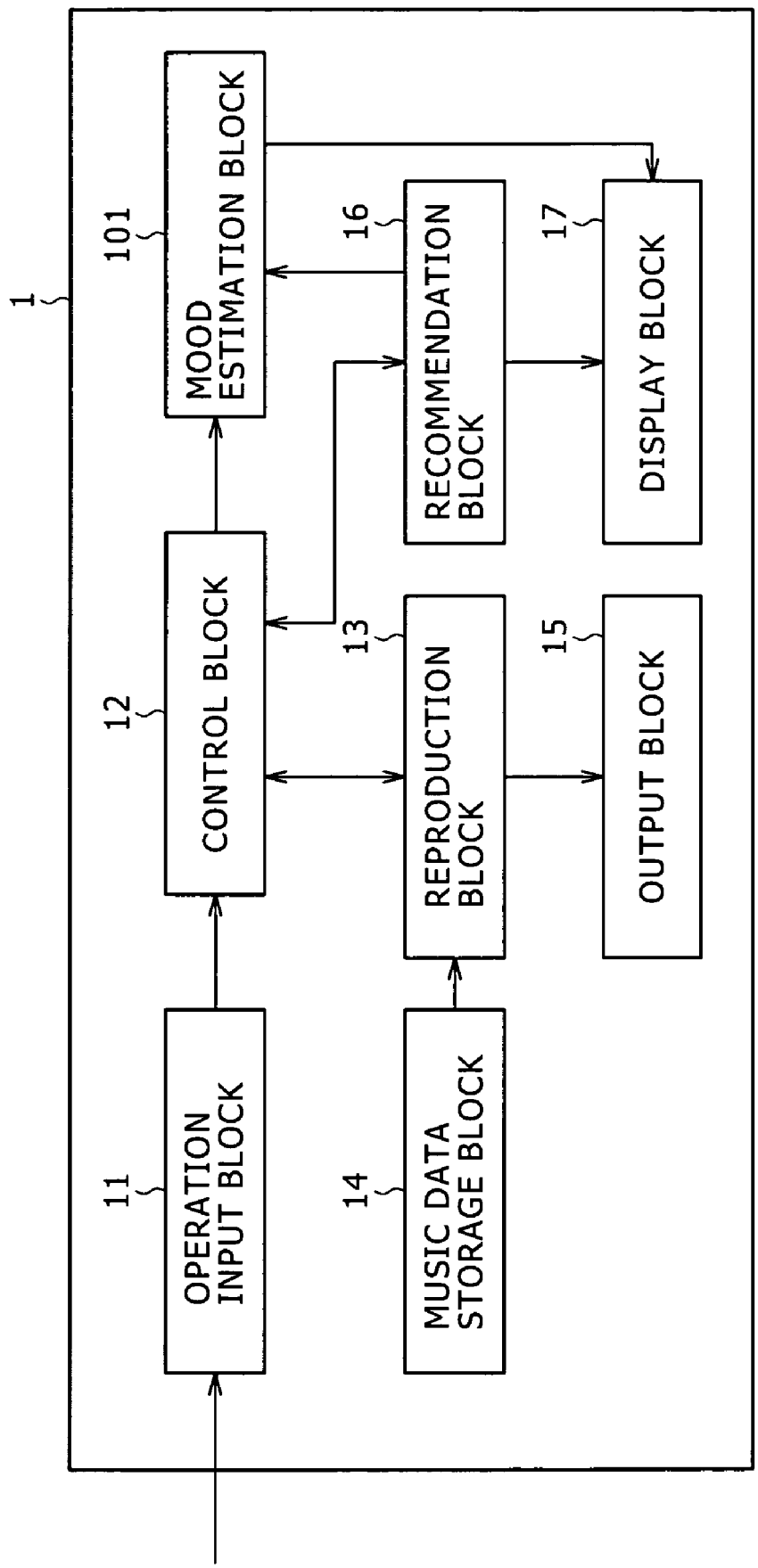
FIG. 16 is a block diagram illustrating a still different exemplary configuration of a reproducing apparatus practiced as still another embodiment of the invention.

A second information processing apparatus practiced as another embodiment of the invention has short-term preference information generation means (for example, a recommendation block 16 shown in. FIG. 16) for generating short-term preference information from attribute information indicative of the attribute of the content selected during a predetermined period of time and control means (for example, a mood estimation block 101 shown in FIG. 16) for controlling the apparatus on the basis of a difference between long-term preference information and short-term preference information.

The control means (for example, the mood estimation block 101 shown in FIG. 16) has estimation means (for example, mood estimation block 112 shown in FIG. 17) for estimating the mood of the user on the basis of the difference between long-term preference information and short-term preference information and device control means (for example, a device control block 113 shown in FIG. 17) for controlling the apparatus in accordance with a mood estimated by the mood estimation means.

The second information processing apparatus further has recommendation means (for example, a recommendation block 123 shown in FIG. 19) for recommending predetermined pieces of content (for example, movies). The control means notifies the recommendation means of a mood estimated by the estimation means. The recommendation means recommends a particular piece of content that corresponds to the mood notified by the control means.

Figure 1:
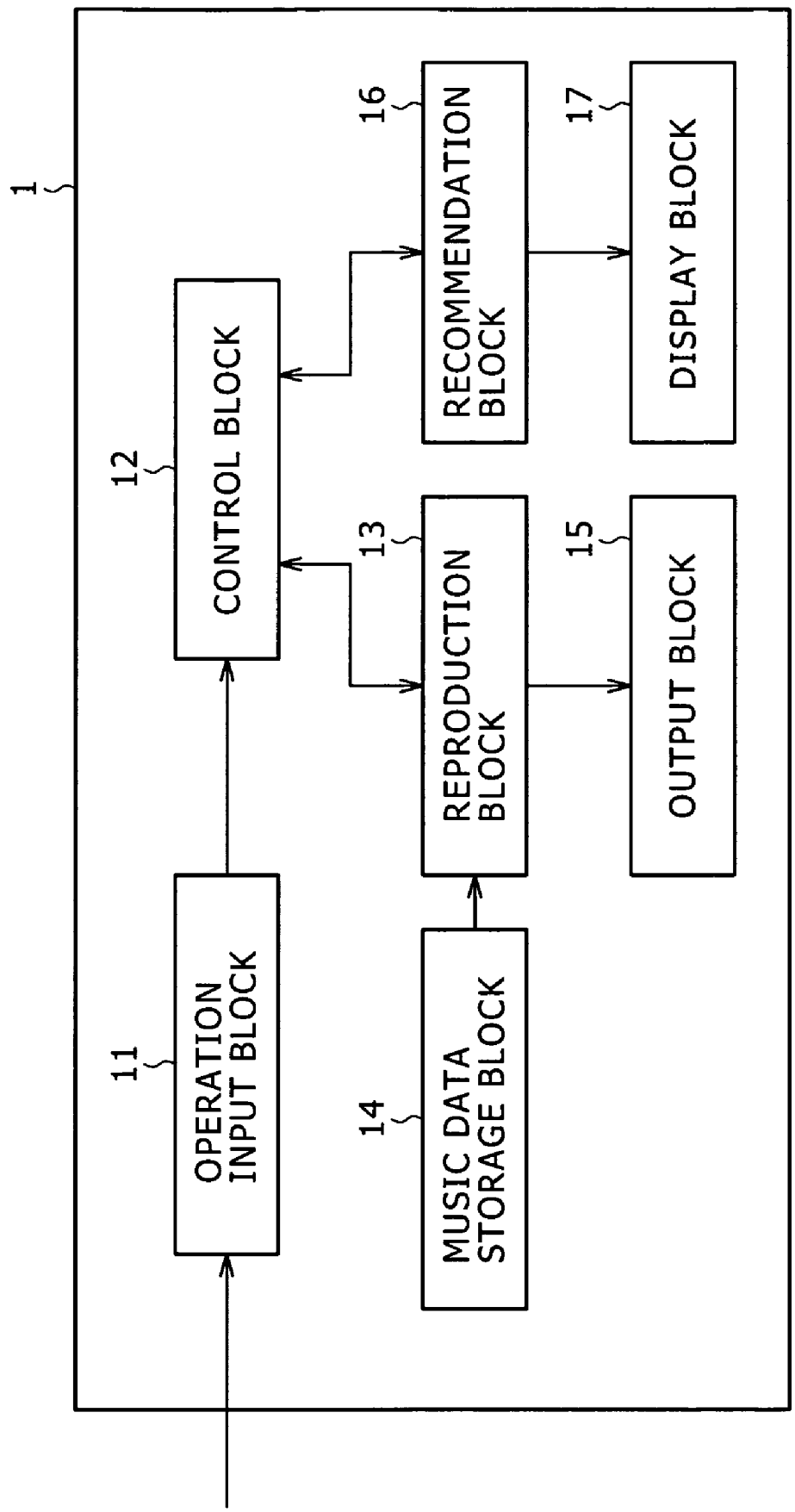
FIG. 1 is a block diagram illustrating an exemplary configuration of a reproducing apparatus practiced as one embodiment of the invention.

Now, referring to FIG. 1, there is shown an exemplary configuration of a reproducing apparatus 1 practiced as one embodiment of the invention. The reproducing apparatus 1 stores music data of a plurality of pieces of music and reproducingly outputs the music data of a particular piece of music selected by the user. The reproducing apparatus 1 also is able to execute music recommendation according to user selection, which will be described later.

An operation input block 11 of the reproducing apparatus 1, composed of input devices such as a touch panel and a cross key for example, recognizes pieces of music selected by the user for example and notifies the control block 12 of the recognized selection.

Receiving the notification of the selected music from the operation input block 11, the control block 12 controls a reproduction block 13 to reproduce the selected music. Under the control by the control block 12, the reproduction block 13 reads the music data of the selected music from a music data storage block 14 and outputs resultant audio data from an output block 15 composed of a speaker for example.

The control block 12 also controls the recommendation block 16 in a predetermined timed relation to make the recommendation block 16 execute music recommendation. Under the control of the control block 12, the recommendation block 16 determines a particular piece of music to be recommended to the user by use of a difference between user preference information based on short-term user music selection (for example, selection made between a time at which the reproducing apparatus 1 is powered on and a time at which the reproducing apparatus 1 is powered off) and long-term user music selection (for example, all selected pieces of music made so far on the reproducing apparatus 1) (this determination will be detailed later). The recommendation block 16 displays a recommendation screen on a display block 17, thereby presenting the determined piece of music.

Referring to FIG. 2, there is shown an exemplary configuration of the recommendation block 16.

A music vector storage block 21 stores music vector Vcnt generated from metadata of the music (the music providable to users) stored in the music data storage block 14 (FIG. 1).

Music vector Vcnt is an n-dimensional vector shown below with "artist name," "tempo," "genre," "rhythm" and other music attribute items used as elements VA:

$$Vcnt=\{VA1, VA2, \ldots, VAn\}$$

Element VAi (i=1, 2, ..., n) is a vector consisting of a plurality of elements c in accordance with a corresponding item and the value of element c is determined by the attribute of that item of the music:

$$VAi=(c1, c2,$$

For example, "tempo" vector VA as element VA is composed of elements c "quick", "slightly quick", "normal", "slightly slow", and "slow" and "tempo" vector VA of a piece of music having quick "tempo" is as shown below (the value of element c corresponding to the attribute is 1 and the values of other elements c are 0):

"Tempo" vector VA=(quick, slightly quick, normal, slightly slow, slow)

"Tempo" vector VA=(1, 0, 0, 0, 0)

"Genre" vector VA as element VA is composed of "pops", "jazz", "classical", "techno", and so on as shown below and "genre" vector VA of a piece of music with "genre" being pops is as shown below:

"Genre" vector VA=(pops, jazz, classical, techno, ...)

"Genre" vector VA=(1, 0, 0, 0, ...)

Eventually, music vector Vcnt with "tempo" being quick and "genre" being pops is as shown below:

Vcnt={..., "tempo" VA (1, 0, 0, 0, 0), ..., "genre" VA (1, 0, 0, 0, 0, ...), ...}

A short-term preference vector generation block 22 is notified by the control block 12 (FIG. 1) of the selected music. Upon notification of the selected music from the control block 12, the short-term preference vector generation block 22 gets music vector Vcnt of that music from the music vector storage block 21 and stores the obtained music vector Vcnt into a short-term preference vector storage block 23 as short-term preference vector Vnp. The short-term preference vector generation block 22 also supplies the obtained music vector Vcnt to a long-term preference vector generation block 24.

In the present example, music vector Vcnt has already been stored in the music vector storage block 21 and the short-term preference vector generation block 22 gets music vector Vcnt therefrom. It is also practicable that metadata (for example, if metadata is stored in correspondence with music data in the music data storage block 14, this metadata is used) corresponding to music stored separately be appropriately obtained to generate music vector Vcnt from this metadata.

On the basis of music vector Vcnt supplied from the short-term preference vector generation block 22, the long-term preference vector generation block 24 updates long-term preference vector Vup stored in a long-term preference vector storage block 25. To be more specific, long-term preference vector generation block 24 adds each of vectors VA making up music vector Vcnt supplied from the short-term preference vector generation block 22 to each of vectors VA making up long-term preference vector Vup currently stored in the long-term preference vector storage block 25.

For example, if music vector Vcnt supplied from the short-term preference vector generation block 22 (namely, music vector Vcnt of the selected music) is Vcnt={... "tempo" VA (0, 0, 0, 0, 1), ..., "genre" VA (1, 0, 0, 0, ...), ...} and long-term preference vector Vup stored in the long-term preference vector storage block 25 is Vup={... "tempo" VA (16, 8, 0, 8, 4), ..., "genre" VA (10, 8, 5, 1, ...), then long-term preference vector Vup is updated to Vup={... "tempo" VA (16, 8, 0, 8, 5), ..., "genre" VA (11, 8, 5, 1, ...), ...}.

A recommendation block 26 computes a difference between short-term preference vector Vnp stored in the short-term preference vector storage block 23 and long-term preference vector Vup stored in the long-term preference vector storage block 25 and, by use of a weight based on the computed difference, determines a piece of music to be recommended to the user, thereby recommending the determined piece of music.

The following describes an exemplary configuration of the recommendation block 26. A difference computation block 31 of the recommendation block 26 computes a difference between short-term preference vector Vnp stored in the short-term preference vector storage block 23 and long-term preference vector Vup stored in the long-term preference vector storage block 25. To be more specific, the difference computation block 31 computes similarity x between these vectors for each of corresponding elements VA ("tempo" vector VA, "genre" vector VA, etc.).

If similarity x is high, it denotes that there is similarity between short-term preference vector Vnp and long-term preference vector Vup in an attribute corresponding to element VA for which that similarity x has been obtained (namely, the difference in that attribute is small). On the other hand, if similarity x is low, it denotes that there is no similarity between short-term preference vector Vnp and long-term preference vector Vup in an attribute corresponding to element VA for which that similarity x has been obtained (namely, the difference in that attribute is great).

An efficacy vector generation block 32 generates efficacy vector VB that is a weight for use in the computation of music similarity Y between short-term preference vector Vnp and music vector Vcnt of the music providable to users in a music similarity computation block 33.

Efficacy vector VB is composed of n elements d that are weights of elements VA (or attributes corresponding to elements VA) of short-term preference vector Vnp and music vector Vcnt:

$$VB = \{d1, d2, \ldots dn\}$$

In principle, the efficacy vector generation block 32 uses, as the value of element di, similarity xi of element VAi between short-term preference vector Vnp and long-term preference vector Vup supplied from the difference computation block 31. If similarity xi is smaller than a certain value, or if there is no similarity in that attribute between short-term preference vector Vnp and long-term preference vector Vup (if the difference is great), then the efficacy vector generation block 32 increases the value of element di as described later.

The music similarity computation block 33 uses efficacy vector VB supplied from the efficacy vector generation block 32 as a weight to compute music similarity Y between short-term preference vector Vnp and music vector Vcnt of the music providable to users (or each music vector Vcnt stored in the music vector storage block 21) and supplies the computed music similarity Y to the recommendation information generation block 34.

On the basis of music similarity Y supplied from the music similarity computation block 33, the recommendation information generation block 34 determines a particular piece of music to be recommended to the user. For example, several top titles having higher music similarity Y are determined as the pieces of music to be recommended to the user.

The recommendation information generation block 34 generates a recommendation screen for the presentation of determined pieces of music to the user and supplies the generated recommendation screen to the display block 17 as required.

Figure 3:
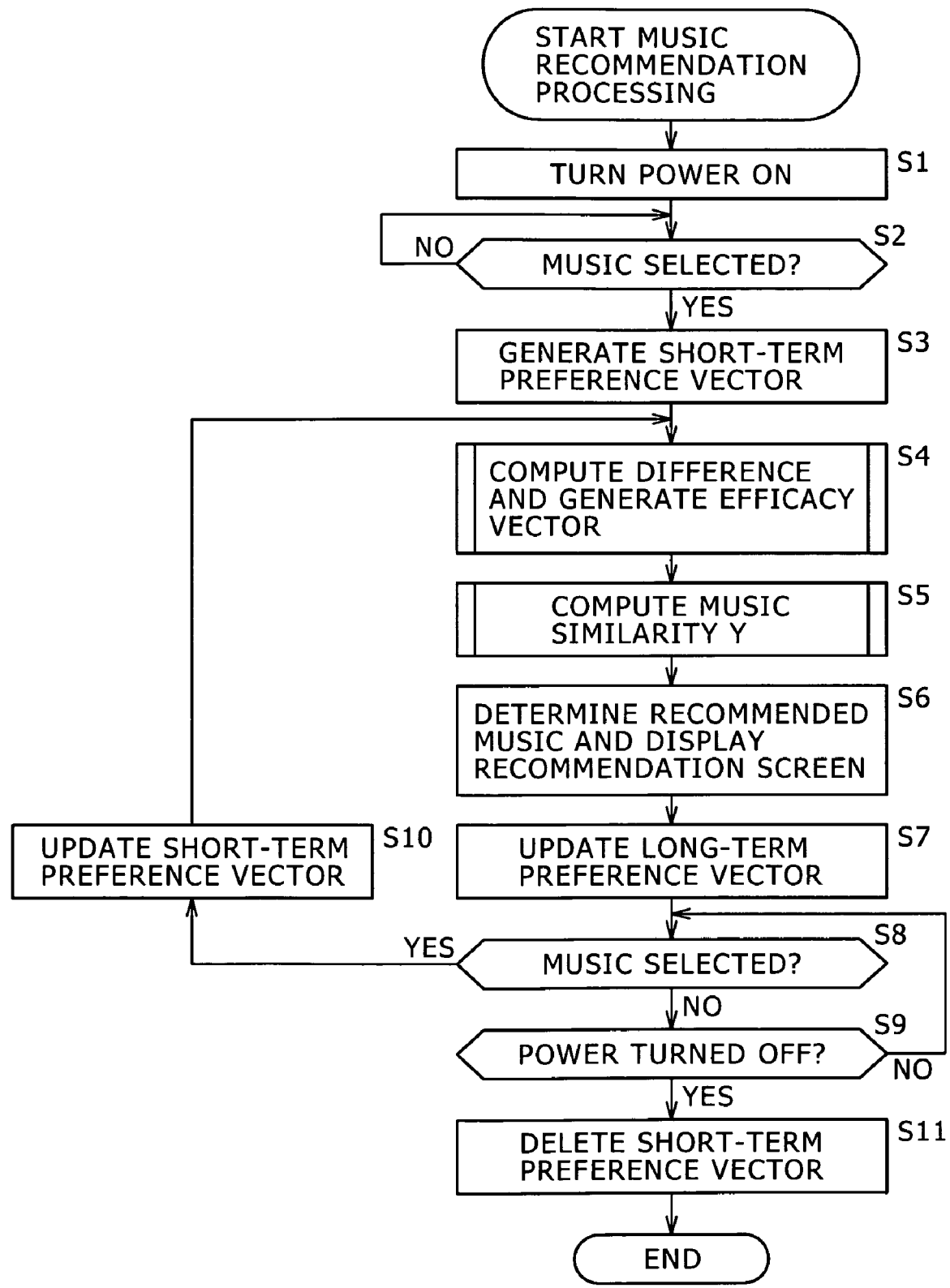
FIG. 3 is a flowchart indicative of music recommendation processing.

The following describes music recommendation processing to be executed in the reproducing apparatus 1 with reference to the flowchart shown in FIG. 3.

In step S1, the power, not shown, to the reproducing apparatus 1 is turned on. In step S2, the control block 12 (FIG. 1) determines whether music selection has been made (namely, a notification indicative of music selection has come from the operation input block 11). If music selection is found made (namely, if music selection made first time after the above-mentioned power-on sequence is found), then the procedure goes to step S3.

It should be noted that, if music selection is found made, (including the music selection in step S8 to be described later), then the control block 12 controls the reproduction block 13 in a routine different from the current routine, thereby reproducing the selected music.

In step S3, the control block 12 notifies the recommendation block 16 (or the short-term preference vector generation block 22 (FIG. 2)) of the selected piece of music. Consequently, the short-term preference vector generation block 22 of the recommendation block 16 gets music vector Vcnt of the selected music from the music vector storage block 21 and stores the obtained vector into the short-term preference vector storage block 23 as short-term preference vector Vnp (namely, generates short-term preference vector Vnp). The short-term preference vector generation block 22 supplies the obtained music vector Vcnt to the long-term preference vector generation block 24.

Next, in step S4, a difference between short-term preference vector Vnp and long-term preference vector Vup is computed to generate efficacy vector VB. The following describes details of this processing with reference to the flowchart shown in FIG. 4.

In step S21, the difference computation block 31 of the recommendation block 26 initializes counter i indicative of elements VAi (or vectors VAi) short-term preference vector Vnp and long-term preference vector Vup to value 1.

In step S22, the difference computation block 31 reads elements VAi (or vectors VAi) indicated by counters i of short-term preference vector Vnp stored in the short-term preference vector storage block 23 and long-term preference vector Vup stored in the long-term preference vector storage block 25.

In step S23, the difference computation block 31 computes similarity xi between elements VAi (or vectors VAi) of short-term preference vector Vnp and long-term preference vector Vup read in step S22, supplying a result thereof to the efficacy vector generation block 32.

To be more specific, an inner product of each vector VAi is divided by a product between absolute values of two vectors VAi to obtain a cosine distance ($\leqq 1$) between vectors VAi as indicated by equation (1) below. It should be noted that, in equation (1) below, S–VAi is indicative of vector VAi of short-term preference vector Vnp and L–VAi is indicative of vector VAi of long-term preference vector Vup.

$$xi = \frac{S - VAi \cdot L - VAi}{|S - VAi| \times |L - VAi|} \quad (1)$$

In step S24, the efficacy vector generation block 32 determines whether similarity xi between elements VAi computed in step S23 is higher than predetermined variation highlighting coefficient r (0.3 for example). If similarity xi is found higher, namely, if similarity xi is high and therefore there is similarity in an attribute corresponding to vector VAi between short-term preference vector Vnp and long-term preference vector Vup (namely, if the difference in that attribute is small), then the procedure goes to step S25, in which the value of element di of efficacy vector VB (or the weight of the attribute corresponding to element AVi) is set to the same value as that similarity xi.

On the other hand, if similarity xi computed in step S23 is not higher than variation highlighting coefficient r (namely, if the similarity is lower than r), namely, if similarity is low and therefore there is no similarity between short-term preference vector Vnp and long-term preference vector Vup in an attribute corresponding to vector VAi (if the difference in that attribute is high), then the procedure goes to step S26.

In step S26, the efficacy vector generation block 32 sets element di of efficacy vector VB to a value obtained by subtracting similarity xi from value 2 (>1.7).

For example, if similarity xi is 0.2 that is not higher than r=0.3 (namely, lower than 0.3), then the value of element di of efficacy vector VB is 1.8 (=2−0.2).

When element di of efficacy vector VB has been determined in step S25 or step S26, then the procedure goes to step S27, in which the difference computation block 31 determines whether all of elements VA of short-term preference vector Vnp and long-term preference vector Vup have been read in step S22 (namely, determines whether counter i=n). If any unread elements VA are found (namely, if counter i<n), then the procedure goes to step S28, in which the value of counter i is incremented by 1, upon which the procedure returns to step S22. In step S22, next element VA (or vector VAi) indicated by counter i is read and the above-mentioned processing is executed from step S23.

If all of elements VA (or vectors VA) are found read in step S27 (if counter i=n), it indicates that the values of all element d of efficacy vector VB have been determined, upon which the procedure goes to step S29. In step S29, the efficacy vector generation block 32 generates efficacy vector VB from the value of determined element d, supplying the generated vector to the music similarity computation block 33.

Thus, the difference between short-term preference vector Vnp and long-term preference vector Vup is obtained. When efficacy vector VB in accordance with the obtained difference has been generated, the procedure goes to step S5 shown in FIG. 3.

In step S5, music similarity Y between short-term preference vector Vnp and music vector Vcnt of providable music is computed. Details of this processing are shown in the flowchart shown in FIG. 5.

In step S41, the music similarity computation block 33 reads one music vector Vcnt from the music vector storage block 21.

In step S42, the music similarity computation block 33 computes similarity (or a cosine distance) between each of elements VA of music vector Vcnt and each of elements VA of short-term preference vector Vnp read in step S41 and multiplies a result of this computation by the value of element d corresponding to efficacy vector VB, thereby totaling the results of the computation to get music similarity Y as shown in equation (2) below. It should be noted that, in equation (2) below, S−VAi is indicative of vector VAi of short-term preference vector Vnp and R−VAi is indicative of vector VAi of music vector Vcnt.

$$Y = \sum_{1}^{i=n} di \cdot \frac{S - VAi \cdot R - VAi}{|S - VAi| \times |R - VAi|} \quad (2)$$

In step S43, the music similarity computation block 33 stores music similarity Y computed in step S42 (namely, the similarity between music vector Vcnt selected in step S41 and short-term preference vector Vnp).

In step S44, the music similarity computation block 33 determines whether all music vectors Vcnt have been read from the music vector storage block 21. If any music vectors Vcnt are found unread, then the procedure returns to step S41 to read next music vector Vcnt to repeat the above-mentioned processing from step S42.

If all music vectors Vcnt are found read in step S44, then the music similarity computation processing is ended, upon which the procedure goes to step S6 shown in FIG. 3.

In step S6, the music similarity computation block 33 supplies music similarity Y computed in step S5 to the recommendation information generation block 34. On the basis of music similarity Y supplied from the music similarity computation block 33, the recommendation information generation block 34 determines a particular piece of music to be recommended. For example, several pieces of music that are high in music similarity Y are determined as the recommended music. The recommendation information generation block 34 displays a recommendation screen on the display block 17 to display the information about the determined recommended music.

In step S7, the long-term preference vector generation block 24 adds music vector Vcnt supplied from the short-term preference vector generation block 22 (step S3) to long-term preference vector Vup stored in the long-term preference vector storage block 25, thereby updating long-term preference vector Vup.

In step S8, the control block 12 (FIG. 1) determines whether music selection has been executed. If no music is found selected, then the procedure goes to step S9, in which the control block 12 determines whether the reproducing apparatus 1 has been powered off. If the reproducing apparatus 1 is found not powered off, then the procedure returns to step S8.

If music selection is found executed in step S8, the procedure goes to step S10. For example, when the user has listened to a particular piece of music selected before and selects another piece of music (or a piece of recommended music or others) by referencing the recommendation screen displayed in step S6 (by keeping the power to the reproducing apparatus 1 turned on), then the procedure goes to step S10.

In step S10, the short-term preference vector generation block 22 gets music vector Vcnt of the piece of music just selected from the music vector storage block 21 and adds the obtained music vector to short-term preference vector Vnp stored in the short-term preference vector storage block 23 to update short-term preference vector Vnp. The short-term preference vector generation block 22 also supplies the obtained music vector Vcnt to the long-term preference vector generation block 24.

Then, back in step S4 again, the a difference between updated short-term preference vector Vnp (step S10) and long-term preference vector Vup (step S7) is computed and efficacy vector VB is computed on the basis of the computed difference. Then, the above-mentioned processing from step S5 is repeated.

If the power is found turned off in step S9, then the control block 12 goes to step S11 to control the short-term preference vector generation block 22 to delete short-term preference vector Vnp from the short-term preference vector storage block 23, upon which the processing executed so far is ended.

Figure 6A:
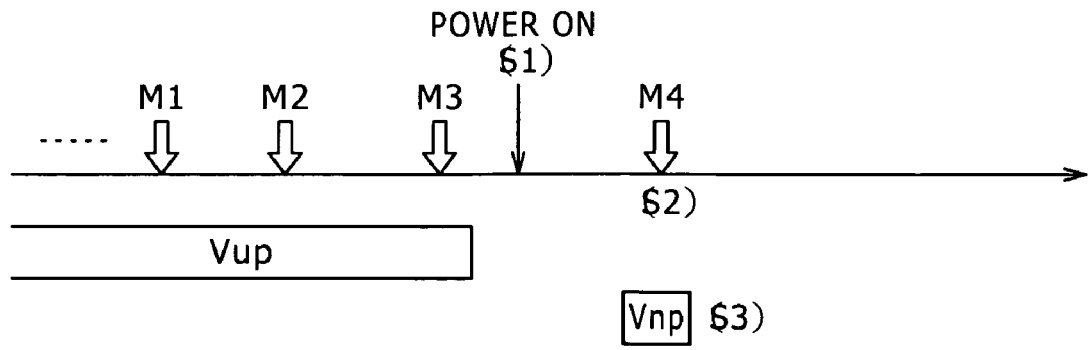
FIGS. 6A, 6B, and 6C are schematic diagrams illustrating the music recommendation processing shown in FIG. 3.
Figure 6B:
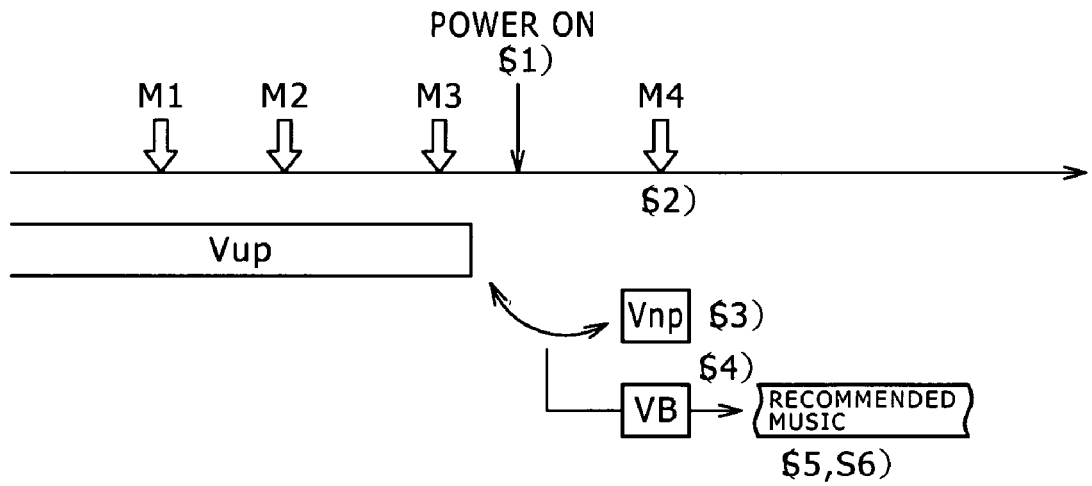
Figure 6C:
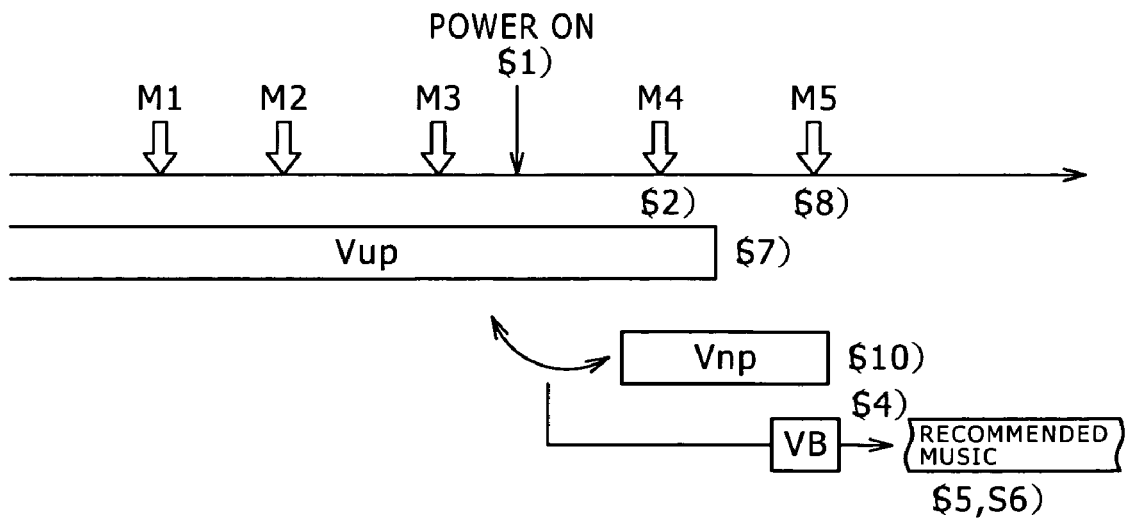

The above-mentioned music recommendation processing is schematically shown in FIGS. 6A, 6B and 6C.

To be more specific, if, as shown in FIG. 6A, two or more pieces of music including music M1 through M3 were selected in the past and there is long-term preference vector Vup corresponding to music vector Vcnt of these pieces of selected music and when music M4 is selected (step S2) after a power-on sequence (step S1 shown in FIG. 3), short-term preference vector Vnp is generated from music vector Vcnt of music M4 (step S3).

Then, as shown in FIG. 6B, efficacy vector VB is generated on the basis of a difference between long-term preference vector Vup and short-term preference vector Vnp and a piece of recommended music is determined on the basis of the generated efficacy vector VB (steps S6 and S6).

As shown in FIG. 6C, long-term preference vector Vup is updated on the basis of music vector Vcnt of music M4 (step S7). When next music M5 is selected (step S8), short-term preference vector Vup based on music vector Vcnt of music M4 selected last is updated on the basis of music vector Vcnt of music M5 (step S10). Then, efficacy vector VB in accordance with a difference between updated long-term preference vector Vup and updated short-term preference vector Vnp is generated (step S4) and a particular piece of music to be recommended is determined by use of the generated efficacy vector VB (steps S5 and S6).

The above-mentioned processing operations are repeated until the power is turned off (step S9).

Figure 4:
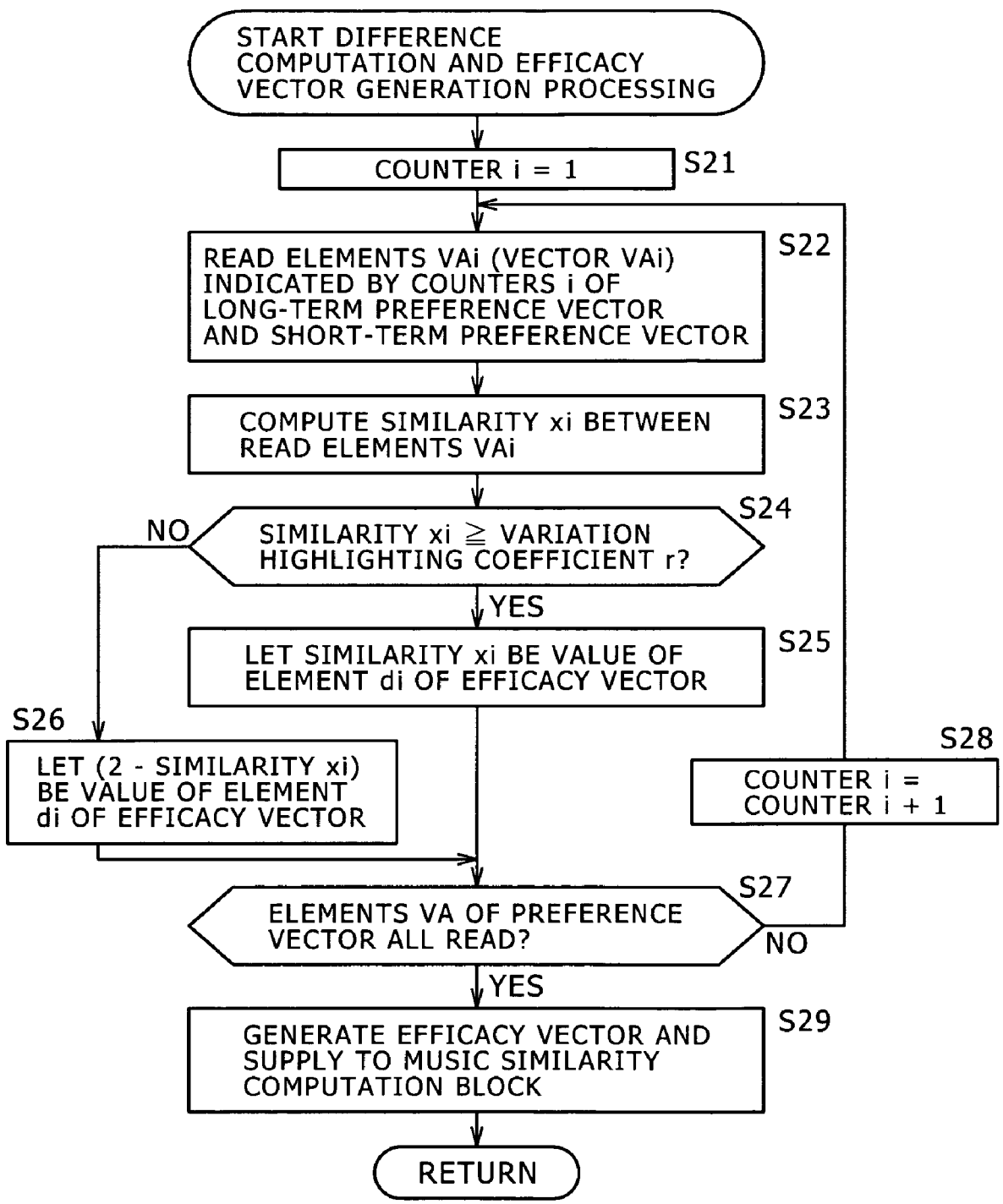
FIG. 4 is a flowchart indicative of details of step S4 shown in FIG. 3.

As described, if similarity x is higher than variation highlighting coefficient r (namely, if there is similarity between short-term preference vector Vnp and long-term preference vector Vup in an attribute corresponding to element VA with which this similarity is obtained), the weight of that attribute (or the value of element di) is set to a value lower than 1 for example (steps S24 and S25 shown in FIG. 4); if similarity x is lower than coefficient r (namely, if there is no similarity between short-term preference vector Vnp and long-term preference vector Vup in an attribute corresponding to element VA with which that similarity is obtained), the weight of that attribute (namely, the value of element di) is set to a value higher than 1.7 for example (steps S24 and S26 shown in FIG. 4). From music vector Vcnt similar to short-term preference vector Vnp in an attribute having a large difference, high music similarity Y is computed even if there is no similarity with short-term preference vector Vnp in another attribute for example (step S42 shown in FIG. 5), so that a piece of music having such music vector Vcnt is recommended (step S6 shown in FIG. 3). Namely, music selection is executed in which an attribute having a large difference between short-term preference vector Vnp and long-term preference vector Vup is highlighted.

For example, if short-term preference vector Vnp is "slow" in "tempo", long-term preference vector Vup is "quick" in "tempo", and similarity x is small between "tempo" vectors VA and therefore there is no similarity in "tempo" between both (the difference is great), element d corresponding to "tempo" vector VA of efficacy vector VB becomes large (namely, the value of weight becomes large) (step S24 and S26 shown in FIG. 4), so that, as with short-term preference vector Vnp, from music vector Vcnt having an attribute of "slow" "tempo", music similarity Y having a large value is obtained if there is little similarity with short-term preference vector Vnp in another attribute for example (step S42 shown in FIG. 5), resulting in the recommendation of a piece of music having "slow" "tempo" (step S6 shown in FIG. 3).

Namely, during a period from the first music selection up to a certain point of time (at which the reproducing apparatus 1 is powered off for example), music of "slow" "tempo" is recommended, thereby executing the music recommendation that corresponds to the emotional status (or the mood) of the user.

It should be noted that, in the present example, variation highlighting coefficient r=0.3; if a larger value is used, the weight of that attributes also gets larger (steps S24 and S26), thereby allowing the music recommendation that is responsive to the difference (namely, the recommendation of music more similar to long-term preference vector Vup).

In the above-mentioned example, there is a wait after the recommendation screen is displayed (S6 shown in FIG. 3) up to the user executes music selection (step S8), namely the music selected by the user is reproduced; it is also practicable to automatically reproduce the music with which highest music similarity is obtained, for example (the reproduced music being sounded from the output block 15).

In this case, the process of step S8 is skipped. Instead of displaying the recommendation screen, a screen for presenting the output music (or the music with which highest music similarity Y is obtained) is displayed. After long-term preference vector Vup is updated in step S7, short-term preference vector Vnp is updated by music vector Vcnt of the outputted music in step S10. Then, the procedure returns to step S4. It should be noted that the determination whether a power-off sequence has been executed in step S9 is appropriately executed after any one of steps S4 through S7 or step S10. If the power is found not turned off, the procedure goes to a next step; if the power is found turned off, the procedure goes to step S11.

Referring to FIG. 7, there is shown another exemplary configuration of the recommendation block 16 of the reproducing apparatus 1. This recommendation block has a variation highlighting coefficient determination block 41 on the recommendation block 26 of the recommendation block 16 shown in FIG. 2.

The variation highlighting coefficient determination block 41 sets (or changes) variation highlighting coefficient r (namely, a reference value by which it is determined whether is any conspicuous difference in that attribute) used when determining the value of element d of efficacy vector VB in the music recommendation processing (step S24 shown in FIG. 4) to a smaller value every time music selection is repeated. It should be noted that, in the example shown in FIG. 4, variation highlighting coefficient r is fixed to a predetermined value (0.3 for example).

Figure 8:
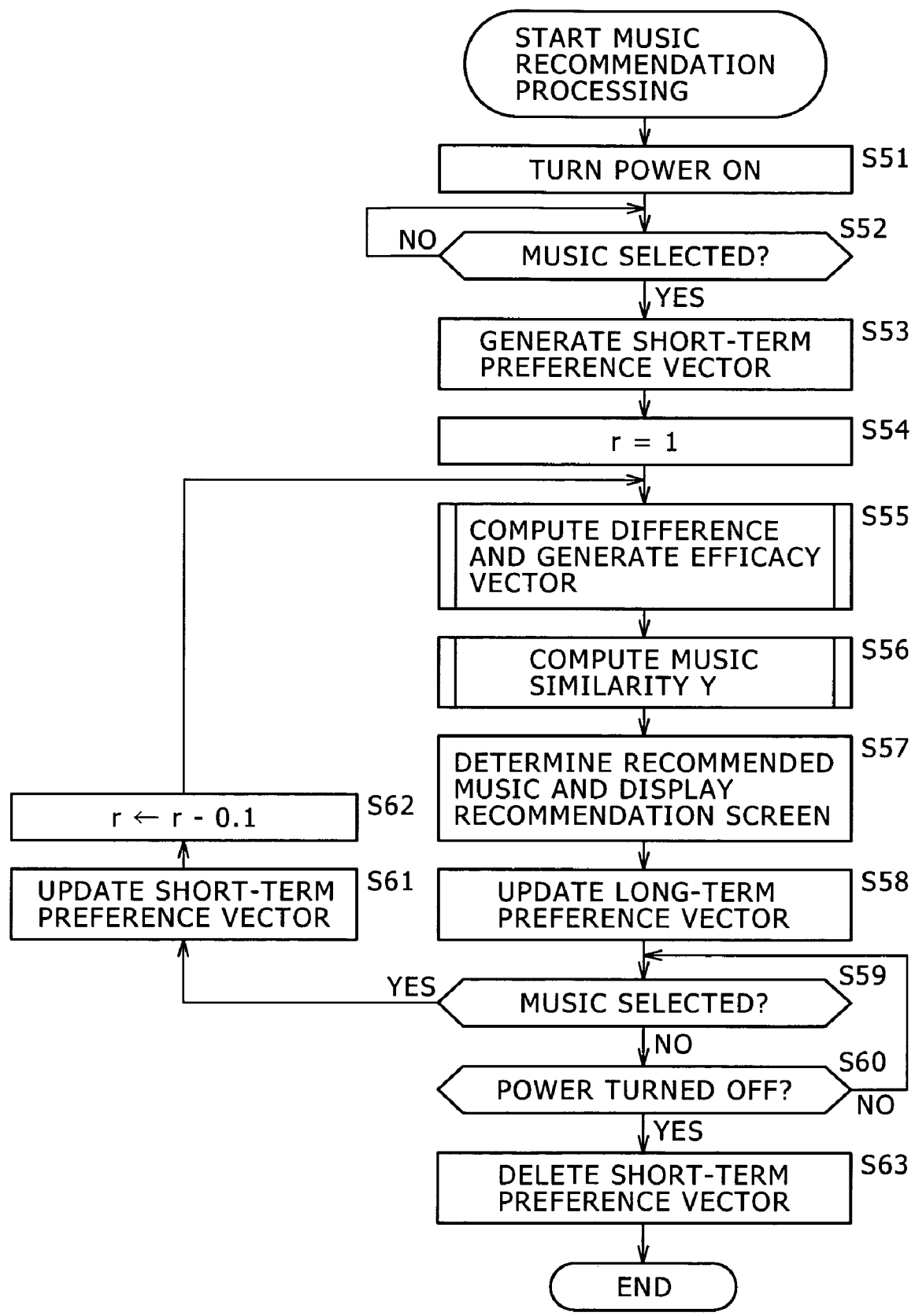
FIG. 8 is a flowchart indicative of another music recommendation processing operation.

The music recommendation processing to be executed in this case is shown in the flowchart of FIG. 8.

In steps S51 through S53, substantially the same processing as that of steps S1 through S3 shown in FIG. 3 is executed, so that the description thereof will be skipped.

In step S54, the variation highlighting coefficient determination block 41 initializes variation highlighting coefficient r to value 1.

Then, in step S55 through S61, substantially the same processing as that of steps S4 through S10 shown in FIG. 3 is executed. Next, in step S62, the variation highlighting coefficient determination block 41 subtracts value 0.1 from variation highlighting coefficient r to use the obtained value as variation highlighting coefficient r. Then, the procedure returns to step S55.

Namely, every time music selection is executed (step S59), variation highlighting coefficient r is decremented by 0.1 and element d of efficacy vector VB is determined on the basis of resultant variation highlighting coefficient r (step S55).

As described above, variation highlighting coefficient r gradually gets smaller every time music selection is executed, so that, every time music selection is executed during a period from turning on to turning off the power to the reproducing apparatus 1 for example, the recommendation may be shifted from the recommendation that is sensitive to the difference between short-term preference vector Vnp and long-term preference vector Vup to the recommendation that is not sensitive. Namely, recommendation may be made gradually in match with normal user preference. When there is no more attribute with which similarity x gets below variation highlighting coefficient r, the efficacy of an attribute similar to long-term preference vector Vup gets higher, thereby recommending the music that is more similar to long-term preference. It should be noted that, instead of short-term preference vector Vnp, similarity x may be computed from long-term preference vector Vup and music vector Vcnt.

Therefore, the recommendation block 16 shown in FIG. 7 allows the recommendation of pieces of music that are usually listened to every time music selection is repeated.

Referring to FIG. 9, there is shown still another exemplary configuration of the recommendation block 16 of the reproducing apparatus 1. Instead of the efficacy vector generation block 32 of the recommendation block 26 of the recommendation block 16, this recommendation block has the efficacy vector generation block 51.

The efficacy vector generation block 32 of the recommendation block 16 shown in FIG. 2 generates efficacy vector VB such that the weight (or element di) of an attribute (namely, an dissimilar attribute) corresponding to element VAi with which similarity xi smaller than a certain value in shod-term preference vector Vnp and long-term preference vector Vup is obtained gets greater. However, the efficacy vector generation block 51 of the recommendation block 16 shown in FIG. 9 generates efficacy vector VB such that the weight (namely, element di) of a similar attribute (namely, an attribute corresponding to element VAi with which great similarity xi is obtained) also gets greater along with the weight of the dissimilar attribute. Generating such efficacy vector VB allows the recommendation of also pieces of music having tunes usually listened to.

The following describes the music recommendation processing in the above-mentioned case. It should be noted that the music recommendation processing in this case is executed in substantially the same manner as the music recommendation processing described above with reference to FIG. 3 except for the difference computation and efficacy vector generation processing of step S4 shown in FIG. 3, so that the following describes the difference computation and efficacy vector generation processing with reference to the flowchart shown in FIG. 10.

In step S71 through S73, substantially the same processing as that of steps S21 through S23 shown in FIG. 4 is executed, so that the description thereof will be skipped.

In step S74, the efficacy vector generation block 51 determines whether similarity xi of element VAi computed in step S73 is higher than predetermined variation highlighting coefficient r1 (0.3 for example). If similarity xi is found higher, namely, if the attributes corresponding to vectors VAi are similar with each other (namely, there is little difference), the procedure goes to step S75.

In step S75, the efficacy vector generation block 51 determines whether that similarity xi is higher than another predetermined variation highlighting coefficient r2 (0.7 for example). If similarity xi is found higher, namely, if the attributes corresponding to vectors VAi are similar with each other (the difference is further small), then the procedure goes to step S76.

In step S76, the efficacy vector generation block 51 sets value 1.5 as the value of element di of efficacy vector VB.

On the other hand, if similarity xi is found smaller than variation highlighting coefficient r2 (0.3<xi<0.7) in step S75, then the procedure goes to step S77, in which the efficacy vector generation block 51 uses similarity xi as the value (0.3<di<0.7) of element di of efficacy vector VB as it is.

If similarity xi is found smaller than variation highlighting coefficient r1 in step S74, namely, if is there is no similarity between the attributes corresponding to vectors VBi (or if there is a large difference between the attributes), then the procedure goes to step S78, in which the efficacy vector generation block 51 subtracts similarity xi from value 2 in substantially the same manner as with step S26 shown in FIG. 4, setting a subtraction result to the value (>1.7) of element di of efficacy vector VB.

If the value of element di of efficacy vector VB is determined in steps S76, S77, or S78, the procedure goes to step S79.

In steps S79 through S81, substantially the same processing as that of steps S27 through S29 shown in FIG. 4 is executed, so that the description thereof will be skipped.

As described above, efficacy vector VB is generated such that element di corresponding to similar attributes also gets larger (value 1.5), so that pieces of music having substantially the same tune as that of the music that is usually listened to may be recommended.

Referring to FIG. 11, there is shown yet another exemplary configuration of the recommendation block 16 of the reproducing apparatus 1 with this recommendation block, a difference computation block 61 and storage block 62 are arranged on the recommendation block 26 of the recommendation block 16 and a recommendation information generation block 63 is arranged instead of the recommendation information generation block 34.

When a piece of music other than recommended is selected in a selective operation executed after a predetermined piece of music is recommended by the recommendation information generation block 63, the difference computation block 61 computes a similarity (namely, a difference) between short-term preference vector Vnp and music vector Vcnt of the selected piece of music for every attribute and supplies, to the storage block 62, the attribute (the attribute corresponding to vector VA of short-term preference vector Vnp with which a small similarity is obtained) (for example, slow tempo) of short-term preference vector Vnp having a small similarity (or a large difference).

It should be noted that, in the present example, the similarity between short-term preference vector Vnp and music vector Vcnt of selected music is computed; it is also practicable to compute the similarity between long-term preference vector Vup and music vector Vcnt of selected music.

The storage block 62 stores an attribute (for example, "tempo": "slow") supplied from the difference computation block 61.

In determining recommended music on the basis of music similarity Y computed by the music similarity computation block 33, the recommendation information generation block 63 excludes the music having any attribute stored in the storage block 62, thereby determining recommended music.

The music recommendation processing in this case will be described below with reference to the flowchart shown in FIG. 12.

In steps S91 through S95, steps S97 through S99, and S102 and S103, substantially the same processing as that of steps S1 through S5 and S7 through S11 shown in FIG. 3 is executed, so that the description thereof will be skipped.

Figure 13:
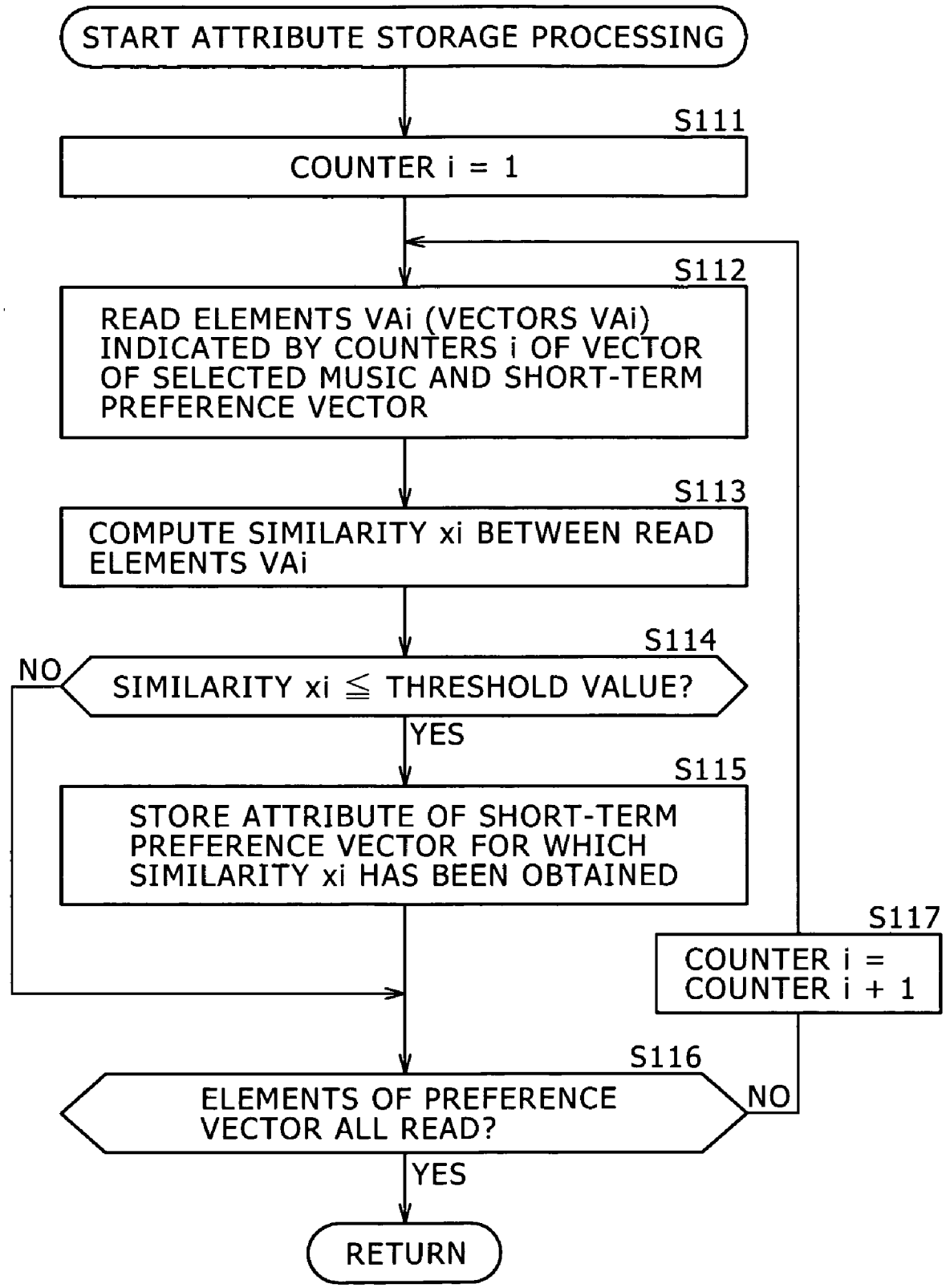
FIG. 13 is a flowchart indicative of details of step S101 of FIG. 12.

In step S100, the short-term preference vector generation block 22 determines whether a piece of music selected in step S98 is the recommended piece of music determined in step S96. If the selected piece of music is found to be a piece of music other than the recommended piece of music, then the procedure goes to step S101, in which short-term preference vector Vnp stored in the short-term preference vector storage block 23 is supplied to the difference computation block 61. The difference computation block 61 gets music vector Vcnt of the selected piece of music from the music vector storage block 21 and computes similarity between elements VA of music vector Vcnt and short-term preference vector Vnp, thereby storing, in the storage block 62, the attribute corresponding to element VA of short-term preference vector with which a similarity smaller than a predetermined threshold value is obtained. Details of this processing are shown in the flowchart of FIG. 13.

In step S111, the difference computation block 61 reads music vector Vcnt of the piece of music selected in step S98 (FIG. 12) from the music vector storage block 21 and initializes the value of counter i indicative of elements VAi (or vectors VAi) of that music vector Vcnt and short-term preference vector Vnp to value 1.

Next, in step S112, the difference computation block 61 reads elements VAi (or vectors VAi) indicated by counter i of music vector Vcnt of the selected piece of music and short-term preference vector Vnp.

In step S113, the difference computation block 61 computes similarity xi between elements VAi (or vectors VAi) of music vector Vcnt and short-term preference vector Vnp read in step S112 (equation 1).

In step S114, the difference computation block 61 determines whether similarity xi of elements VAi computed in step S113 is below a predetermined threshold value. If similarity xi is found below, namely, there is no similarity between the attributes corresponding to vectors VAi and therefore a difference thereof is great, then the procedure goes to step S115, in which the attribute corresponding to element VA of short-term preference vector Vnp with which that similarity xi has been obtained into the storage block 62.

If similarity xi is found greater than the predetermined threshold value in step S114 or if the attribute has been stored in step S115, then the procedure goes to step S116, in which the difference computation block 61 determines whether all elements VA of music vector Vcnt and short-term preference vector Vnp have been read in step S112. If there are any elements VA unread, then the procedure goes to step S117 to increment the value of counter i by one, upon which the procedure returns to step S112. In step S112, next element VAi (or vector VAi) indicated by counter i is read to repeat the above-mentioned processing from step S113.

Figure 12:
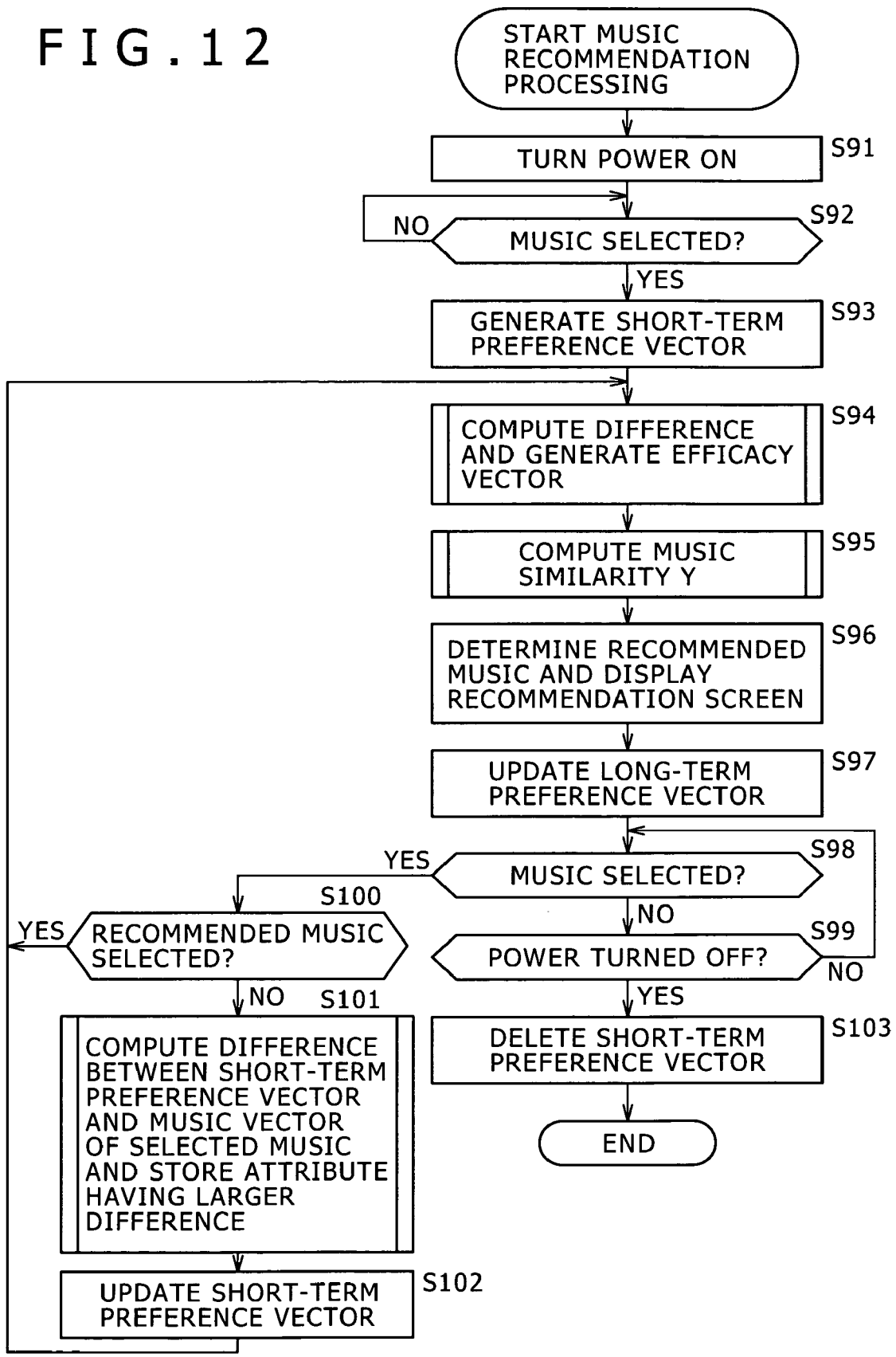
FIG. 12 is a flowchart indicative of yet another recommendation processing operation.

If all elements VA (or vectors VA) are found read in step S116, then the difference computation processing is ended, upon which the procedure goes to step S102 shown in FIG. 12.

In step S102, short-term preference vector Vnp is updated by music vector Vcnt of the piece of music selected in step S98. Then, when efficacy vector VB is generated and music similarity Y is computed in steps S94 and S95, then the recommendation information generation block 63 determines a piece of music to be recommended on the basis of the computed music similarity Y in step S96. In doing so, the recommendation information generation block 63 excludes the music having the attributes stored in the storage block 62 to determine a piece of recommended music.

As described above, if no recommended music has been selected, the attributes having a large difference between music vector Vcnt of the music other than the selected music and short-term preference vector Vnp for example are stored and the music having these attributes is excluded from next recommendation processing, resulting in more appropriate recommendation.

Figure 14:
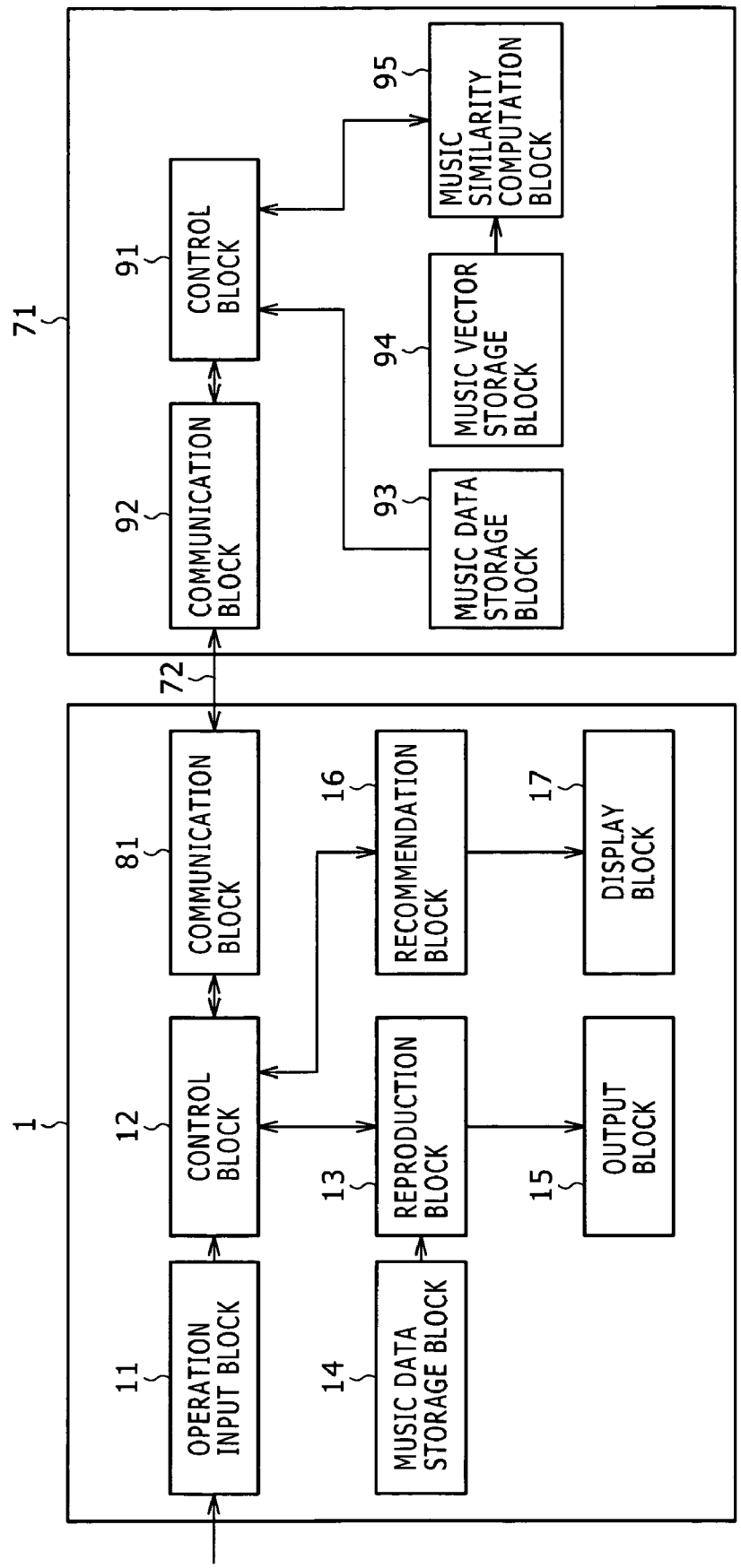
FIG. 14 is a block diagram illustrating a different exemplary configuration of a reproducing apparatus practiced as another embodiment of the invention.

In the above-mentioned music recommendation in the reproducing apparatus 1 shown in FIG. 1, the music held in the reproducing apparatus 1 itself is recommended. It is also practicable to recommend the music held in the server 71 by making communication therewith over a network 72 for example as shown in FIG. 14.

The following describes an exemplary configuration of the reproducing apparatus 1 in the above-mentioned case in which the music stored in the server 71 is recommended. The reproducing apparatus 1 has a communication block 81 as shown in FIG. 14. The communication block 81 controls the communication that is executed via the network 72, transmits short-term preference vector Vnp and efficacy vector VB generated in the recommendation block 16 of the reproducing apparatus 1 to the server 71 as will be described later, and receives, from the server 71, music similarity Y between short-term preference vector Vnp and music vector Vcnt of the music held in the server 71 computed on the basis of efficacy vector VB used as a weight, thereby supplying music similarity Y to the recommendation block 16 via the control block 12.

The following describes an exemplary configuration of the server 71.

A control block 91 controls each of the component blocks of the server 71.

A communication block 92 controls the communication with the reproducing apparatus 1 to receive short-term preference vector Vnp and efficacy vector VB from the reproducing apparatus 1 and supply the received vectors to the control block 91. The communication block 92 also supplies music similarity Y supplied from the control block 91 to the reproducing apparatus 1.

A music data storage block 93 stores, in the reproducing apparatus 1, the data associated with the music that is providable to users. A music vector storage block 94 stores music vector Vcnt of the music stored in the music data storage block 93.

Figure 15:
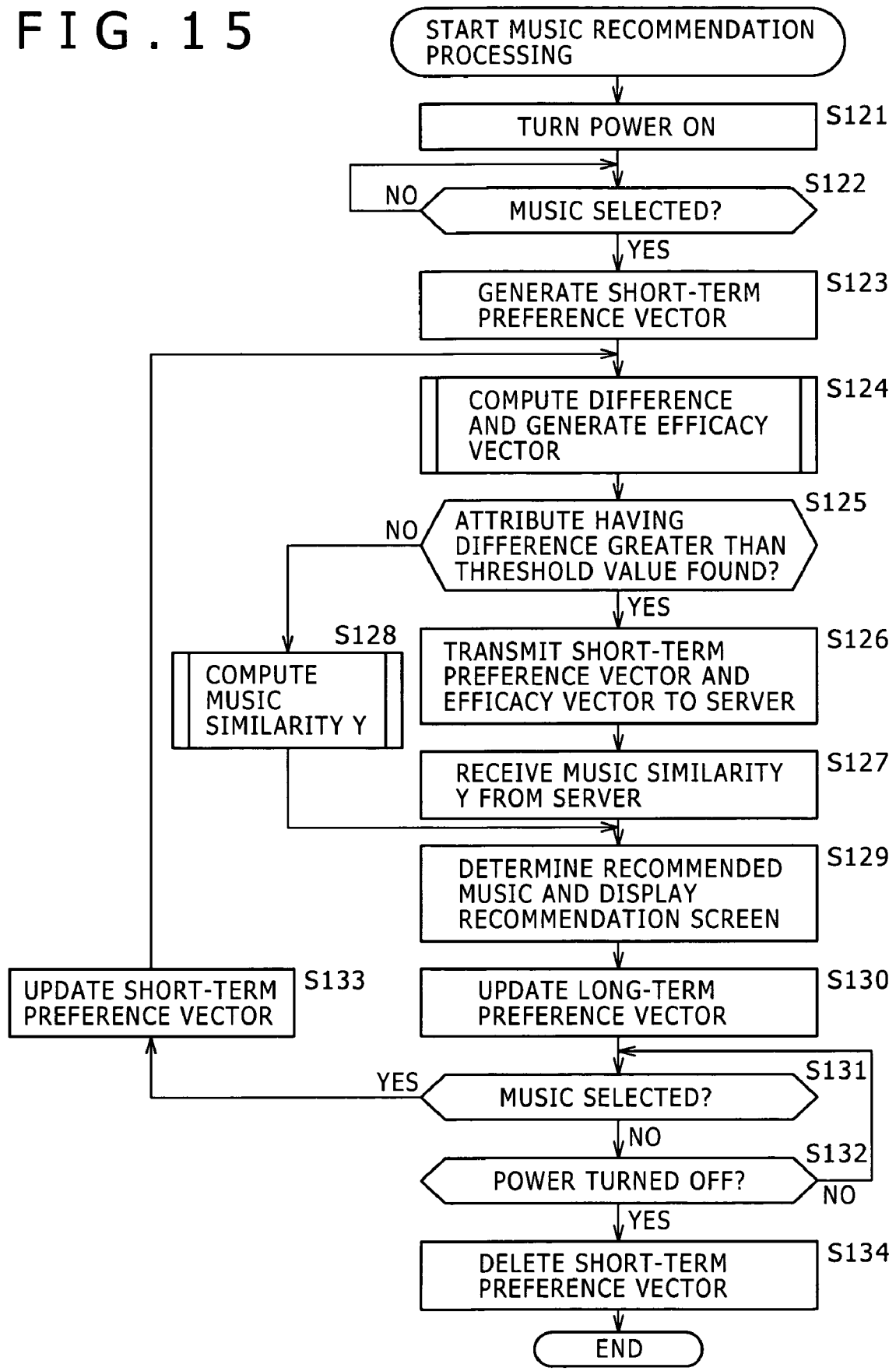
FIG. 15 is a flowchart indicative of a different recommendation processing operation.

Like the music similarity computation block 33 (FIG. 2) of the recommendation block 16 of the reproducing apparatus 1, a music similarity computation block 95 uses efficacy vector VB supplied from the reproducing apparatus 1 as a weight to compute music similarity Y between short-term preference vector Vnp supplied from the reproducing apparatus 1 and music vector Vcnt stored in the music vector storage block 94, thereby supplying the computed music similarity to the control block 91.

the following describes the music recommendation processing by the reproducing apparatus 1 in this case with reference to the flowchart shown in FIG. 15.

In steps S121 through S124, substantially the same processing as that of steps S1 through S4 shown in FIG. 3 is executed, so that the description thereof will be skipped.

In step S125, the control block 12 determines whether there is any similarity xi (computed in the processing equivalent to steps S21, S22, S23, S27, and S28 shown in FIG. 4) computed by the processing of step S124 that is smaller than a predetermined threshold value (any attribute having a difference greater than a predetermined value). If any is found, then the procedure goes to step S126.

In step S126, the control block 12 controls the communication block 81 to transmit short-term preference vector Vnp generated in step S123 and efficacy vector VB generated in step S124 to the server 71.

Consequently, the control block 91 receives short-term preference vector Vnp and efficacy vector VB from the reproducing apparatus 1 and supplies these vectors to the music similarity computation block 95.

Figure 5:
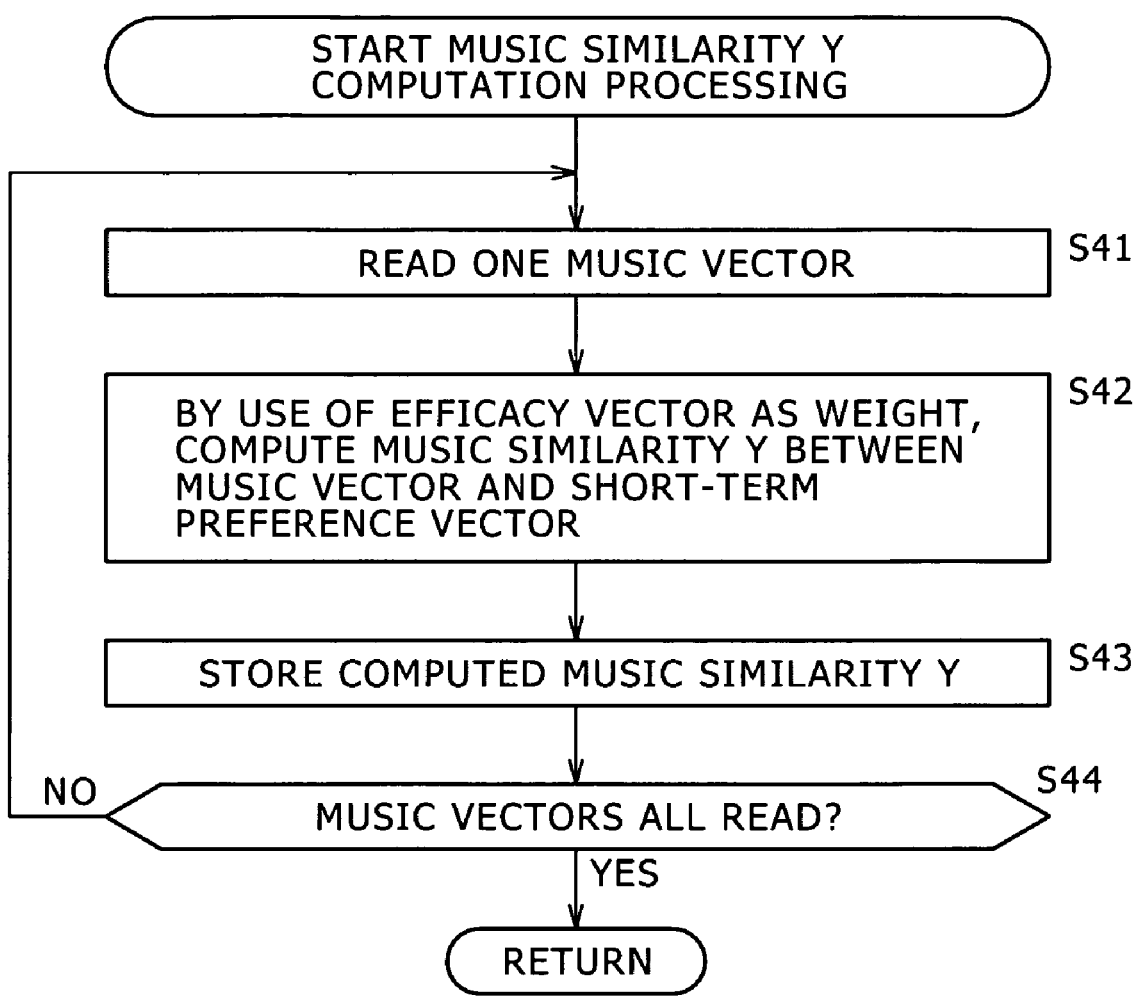
FIG. 5 is a flowchart indicative of details of step S5 shown in FIG. 3.

Like the music similarity computation block 33 of the recommendation block 16 of the reproducing apparatus 1 (by the processing equivalent to steps S41 through S44 shown in FIG. 5), the music similarity computation block 95 of the server 71 uses efficacy vector VB as a weight to compute music similarity Y between received short-term preference vector Vnp and music vector Vcnt stored in the music vector storage block 94 and supplies the computed music similarity Y to the control block 91.

The control block 91 controls the communication block 92 to transmit music similarity Y supplied from the music similarity computation block 95 to the reproducing apparatus 1.

Thus, music similarity Y is supplied from the server 71, so that the control block 12 of the reproducing apparatus 1 receives the supplied music similarity Y via the communication block 81 in step S127.

If no attribute having similarity x smaller than a predetermined threshold value is found in step S125, then the procedure goes to step S128, in which efficacy vector VB generated in step S124 is used as a weight in generally the same manner as step S5 (for details, refer to FIG. 5) shown in FIG. 3 to compute music similarity Y between short-term preference vector Vnp generated in step S123 and music vector Vcnt stored in the music vector storage block 21 (FIG. 2) of the reproducing apparatus 1.

When music similarity Y is received in step S127 or music similarity Y is computed in step S128, then the procedure goes to step S129, in which the recommendation block 16 (or the recommendation information generation block 34) determines recommended pieces of music on the basis of music similarity Y received from the server 71 or music similarity Y computed by the reproducing apparatus 1 itself and displays a recommendation screen for presenting the determined recommended pieces of music onto the display block 17.

In steps S130 through S134, substantially the same processing as that of steps S7 through S11 is executed, so that the description thereof will be skipped.

As described above, the music held in the server 71 separate from the reproducing apparatus 1 may be recommended.

Conventionally, methods in which the music held in servers is recommended are known; normally, however, these methods require to send user preference information (namely, preference information equivalent to long-term preference vector Vup) to servers. This user preference information is high in privacy for users if the information has been accumulated over a long time, so that, if this information is tampered, users may be damaged. On the other hand, in the example shown in FIG. 14, short-term preference vector Vnp is transmitted as preference information; however, this information is generated on the basis of the music selection made in a relatively limited and short period of time, so that, even if this information is tampered, the damages to users may be limited.

Namely, the recommendation of the music held in the server 71 according to the method shown in FIG. 14 may execute music recommendation more securely.

Further, as described above, the music held in the server 71 is recommended when a difference between short-term preference vector Vnp and long-term preference vector Vup is higher than a certain level (namely, if the decision of step S125 is YES), so that the transmission of short-term preference vector Vnp to the server 71 is limited, thereby allowing the use of the server 71 more securely. Normally, it is expected that pieces of music that are similar to tunes always listened to be often stored in the reproducing apparatus 1, but pieces of music different from tunes that are always listened to be not recorded in the reproducing apparatus 1, so that using the server 71 when the difference between short-term preference vector Vnp and long-term preference vector Vup is higher than a certain level allows the recommendation of music more efficiently.

Referring to FIG. 16, there is shown another exemplary configuration of the reproducing apparatus 1. The reproducing apparatus in this example has a mood estimation block 101 in addition to the configuration of the reproducing apparatus 1 shown in FIG. 1.

Similarity x between elements VA of short-term preference vector Vnp and long-term preference vector Vup computed in the recommendation block 16 is supplied to the mood estimation block 101. The mood estimation block 101 extracts, from similarity x supplied from the recommendation block 16, smaller similarity x than a predetermined threshold value and, on the basis of an attribute corresponding to element VA of short-term preference vector Vnp with which extracted similarity x has been obtained, estimates the mood of the user. Namely, the mood of the user is estimated in accordance with an attribute that is different from usual.

Next, on the basis of the estimated user mood, the mood estimation block 101 adjusts the brightness of a display screen on the display block 17.

Figures 17, 18:
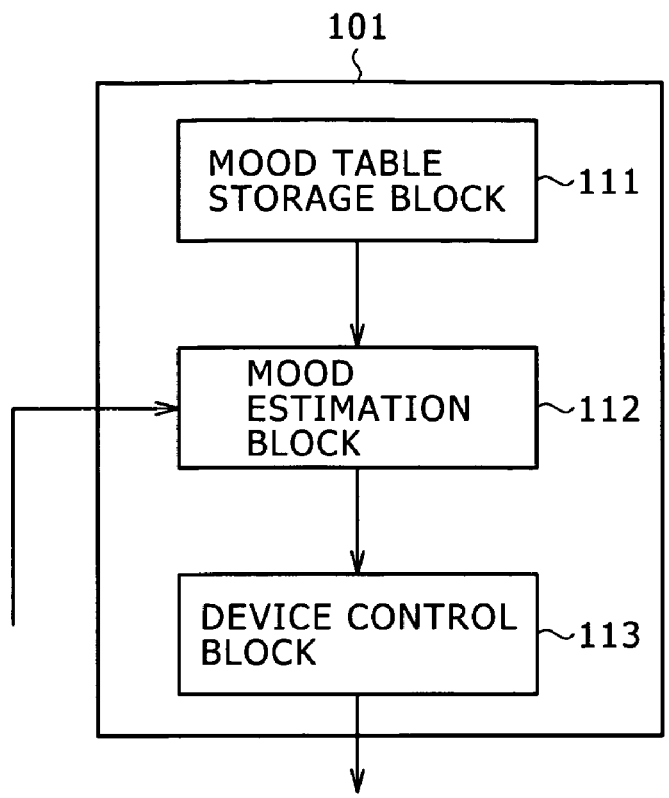
FIG. 17 is a block diagram illustrating an exemplary configuration of a mood estimation block 101 shown in FIG. 16.
FIG. 18 is a schematic diagram illustrating an example of a mood table stored in a mood table storage block 111 shown in FIG. 17.

Referring to FIG. 17, there is shown an exemplary configuration of the mood estimation block 101.

Information shown in FIG. 18 indicative of the moods in accordance with attributes of music are set to a mood table storage block 111 of the mood estimation block 101.

Similarity x between elements VA of short-term preference vector Vnp and long-term preference vector Vup supplied from the recommendation block 16 is supplied to a mood estimation block 112. The mood estimation block 112 extracts, from the recommendation block 16, similarity x smaller than a predetermined threshold value from similarity x supplied.

Next, the mood estimation block 112 references a mood table (FIG. 18) stored in the mood table storage block 111 to detect mood information corresponding to an attribute corresponding to element VA with which extracted similarity x has been obtained, supplying the detected mood information to the device control block 113.

Receiving the mood information (namely, the information indicative of "bright", "dark", etc.) supplied from the mood estimation block 112, the device control block 113 controls the brightness of the screen of the display block 17 in accordance with the mood information. For example, if the mood information indicative of dark mood is supplied, the device control block 113 lowers the brightness of the screen; if the mood information indicative of bright mood is supplied, the device control block 113 increases the brightness of the screen.

It should be noted that, in the example shown in FIG. 16, the brightness of the screen of the display block 17 is controlled on the basis of an estimated mood; it also practicable to control the volume of the output block 15, predetermined functions of external devices, and so on.

Figure 19:
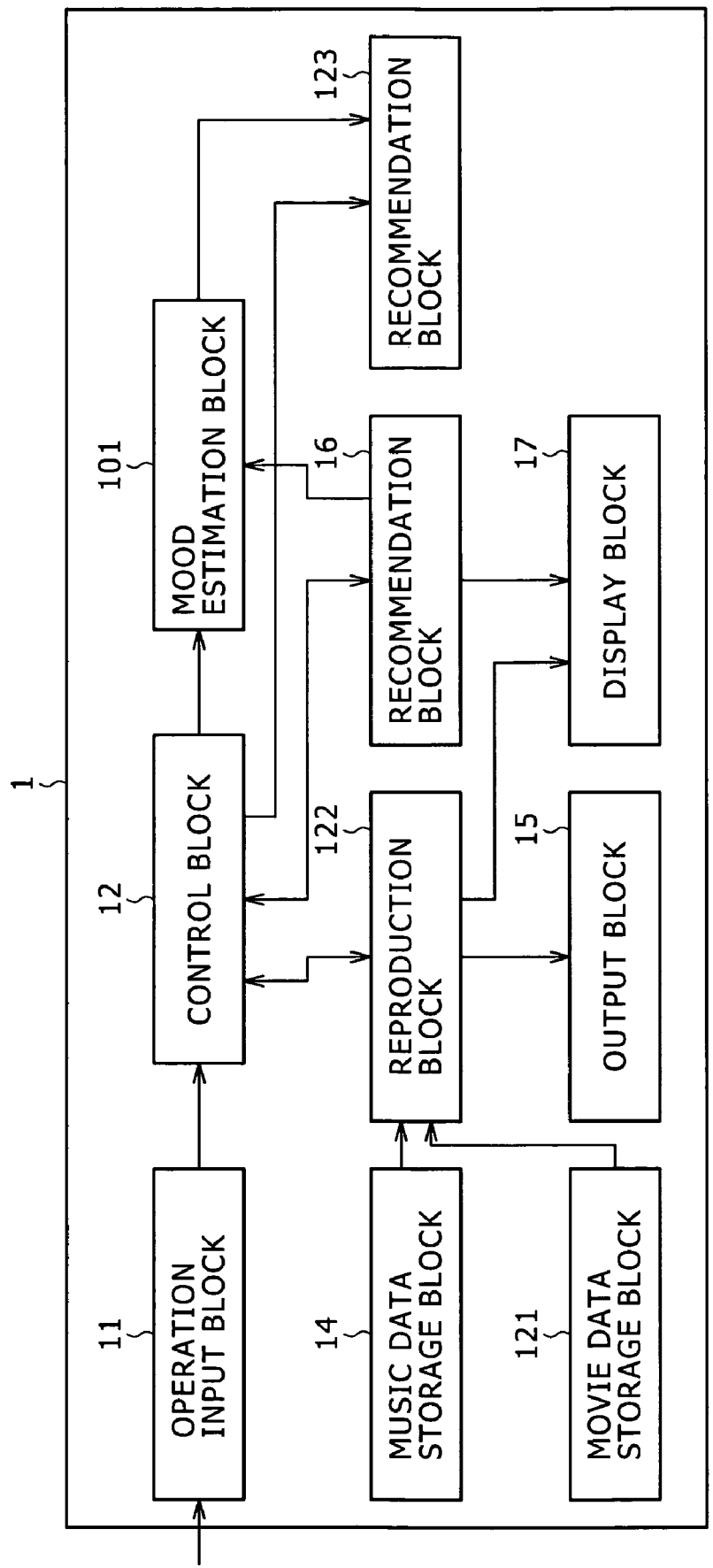
FIG. 19 is a block diagram illustrating a yet different exemplary configuration of a reproducing apparatus practiced as yet another embodiment of the invention.

Referring to FIG. 19, there is shown still another exemplary configuration of the reproducing apparatus 1. This reproducing apparatus further has a movie data storage block 121 and a recommendation block 123 in addition to the configuration of the reproducing apparatus 1 shown in FIG. 16, and a reproduction block 122 instead of the reproduction block 13.

The movie data storage block 121 stores movie video and audio data that users are able to view (hereafter, these video and audio data are generically referred to as movie data).

Like the reproduction block 13 shown in FIG. 16, the reproduction block 122 reproduces predetermined music data stored in the music data storage block 14 (or reproduces the music data of the music selected by the user) under the control of the control block 12 and outputs resultant audio data through the output block 15. Also, under the control of the control block 12, the reproduction block 122 reproduces predetermined movie data stored in the movie data storage block 121 (or reproduces the movie data of a movie selected by the user) and outputs resultant audio data through the output block 15, thereby outputting the video data to the display block 17.

Information indicative of an estimated user mood is supplied from the mood estimation block 101 to the recommendation block 123. Basically like the recommendation block 16, the recommendation block 123 determines a movie to the recommended to the user and recommends the determined movie to the user. As shown in FIG. 20, the recommendation block 123 stores predetermined attributes (of movies) in accordance with moods and therefore is able to positively recommend movies having attributes corresponding to the information indicative of moods supplied from the mood estimation block 101 in the determination of recommended movies.

It should be noted that, in the example shown in FIG. 19, user moods estimated by music selection are used for movie recommendation; it is also practicable to estimate a user mood from a selected movie to use the estimated mood for music recommendation.

The above-mentioned sequence of processing operations may be executed by software as well as hardware. When the above-mentioned sequence of processing operations is executed by software, the programs constituting the software are installed in a computer, thereby functionally realizing the reproducing apparatus 1.

Referring to FIG. 21, there is shown an exemplary configuration of a computer 501. A CPU (Central Processing Unit) 511 is connected with an input/output interface 516 via a bus 515. When instructions come from an input block 518 based on a keyboard and a mouse for example entered by a user, the CPU 511 load corresponding programs into a RAM (Random Access Memory) 513 from a ROM (Read Only Memory) 512, a hard disc 514, or recording media such as a magnetic disc 531, an optical disc 532, a magneto-optical disc 533, and a semiconductor memory 534 loaded on a drive 520, thereby executing loaded programs. Consequently, the above-mentioned various processing operations are executed. Further, the CPU 511 outputs, as required, the results of processing to an output block 517 based on an LCD (Liquid Crystal Display) for example via the input/output interface 516, for example. It should be noted that programs may be stored in the hard disc 514 or the ROM 512 in advance for the provision to the user with the computer 501, may be provided as package media such as the magnetic disc 531, the optical disc 532, the magneto-optical disc 533, and the semiconductor memory 534, or may be downloaded to the hard disc 514 from a communication satellite or a network for example through a communication block 519.

It should be noted herein that the steps for describing each program recorded in recording media include not only the processing operations which are sequentially executed in a time-dependent manner but also the processing operations which are executed concurrently or discretely.

While preferred embodiments of the present invention have been described using specific terms, such description is for illustrative purpose only, and it is to be understood that changes and variations may be made without departing from the spirit or scope of the following claims.

What is claimed is:

1. An information processing apparatus for managing long-term preference attributes of a user, comprising:
   a processor;
   a memory storing the long-term preference attributes, the long-term preference attributes being based on attributes of content selected by the user during a first period;
   means for receiving the user's selection of content during a second period that is shorter than the first period;
   means for generating short-term preference attributes of the user from attributes of the content selected by the user during the second period; and
   decision means for determining content to be recommended from content available to the user, comprising:
   means for computing a first similarity value based on a similarity between the long-term preference attributes and the short-term preference attributes, the first similarity value indicating how similar the long-term preference attributes are to the short-term preference attributes;
   means for determining whether the first similarity value is below a reference value; and
   means for, when it is determined that the first similarity value is below the reference value:
   generating weight information for recommending the content to the user based on performing a mathematical operation on the first similarity value and a predetermined weight value weighting attributes of the short-term preference attributes that are dissimilar to corresponding attributes of the long-term preference attributes more heavily than attributes of the short-term preference attributes that are similar to corresponding attributes of the long-term preference attributes;
   computing a second similarity value based on a similarity between the short-term preference attributes of the user and corresponding attributes of the content available to the user and on the weight information; and
   selecting for recommendation the content from the content available to the user based on the second similarity value such that the selected content tends to have attributes that are dissimilar to corresponding attributes of the long-term preference attributes; and
   means for recommending the selected content to the user, wherein as the user selects content during the second period, the reference value is reduced.

2. The information processing apparatus according to claim 1, wherein, if content other than the recommended content is selected by the user, the decision means excludes, from the recommended content, content having attributes dissimilar to attributes of the selected content and one of the long-term preference attributes and the short-term preference attributes.

3. The information processing apparatus according to claim 1, further comprising:
   means for communicating with a server storing the content available to the user; and
   means for transmitting the short-term preference attributes and the weight information to the server via the means for communicating if a difference between the long-term preference attributes and the short-term preference attributes is large and for acquiring, from the server, the computed second similarity value,
   wherein the means for determining content determines the content to be recommended to the user based on the acquired second similarity value.

4. An information processing method for managing long-term preference attributes of a user, the method comprising:
   generating the long-term preference attributes of the user from attributes of content selected by the user during a first period;

receiving the user's selection of content during a second period that is shorter than the first period;

generating short-term preference attributes of the user from attributes of the content selected by the user during the second period; and determining content to be recommended from content available to the user by:

computing a first similarity value based on a similarity between the long-term preference attributes and the short-term preference attributes, the first similarity value indicating how similar the long-term preference attributes are to the short-term preference attributes;

determining whether the first similarity value is below a reference value; and when it is determined that the first similarity value is below the reference value:

generating weight information for recommending the content to the user based on performing a mathematical operation on the first similarity value and a predetermined weight value weighting attributes of the short-term preference attributes that are dissimilar to corresponding attributes of the long-term preference attributes more heavily than attributes of the short-term preference attributes that are similar to corresponding attributes of the long-term preference attributes;

computing a second similarity value based on a similarity between the short-term preference attributes of the user and corresponding attributes of the content available to the user and on the weight information; and selecting for recommendation the content from the content available to the user based on the second similarity value such that the selected content tends to have attributes that are dissimilar to corresponding attributes of the long-term preference attributes; and recommending the selected content to the user, wherein as the user selects content during the second period, the reference value is reduced.

5. A computer-readable memory device storing a program which, when executed by a processor, causes the processor to perform a method for controlling an information processing apparatus for managing long-term preference attributes of a user, the method comprising:

generating the long-term preference attributes of the user from attributes of content selected by the user during a first period;

receiving the user's selection of content during a second period that is shorter than the first period;

generating short-term preference attributes of the user from attributes of the content selected by the user during the second period; and determining content to be recommended from content available to the user by:

computing a first similarity value based on a similarity between the long-term preference attributes and the short-term preference attributes, the first similarity value indicating how similar the long-term preference attributes are to the short-term preference attributes;

determining whether the first similarity value is below a reference value; and when it is determined that the first similarity value is below the reference value:

generating weight information for recommending the content to the user based on performing a mathematical operation on the first similarity value and a predetermined weight value weighting attributes of the short-term preference attributes that are dissimilar to corresponding attributes of the long-term preference attributes more heavily than attributes of the short-term preference attributes that are similar to corresponding attributes of the long-term preference attributes;

computing a second similarity value based on a similarity between the short-term preference attributes of the user and corresponding attributes of the content available to the user and on the weight information; and selecting for recommendation the content from the content available to the user based on the second similarity value such that the selected content tends to have attributes that are dissimilar to corresponding attributes of the long-term preference attributes; and recommending the selected content to the user, wherein as the user selects content during the second period, the reference value is reduced.

6. An information processing apparatus for managing long-term preference attributes of a user and for controlling a device, the information processing apparatus comprising:

a processor;

a memory storing the long-term preference attributes of the user, the long-term preference attributes being based on attributes of content selected by the user during a first period;

means for receiving the user's selection of content during a second period that is shorter than the first period;

means for generating short-term preference attributes of the user from attributes of the content selected by the user during the second period; and means for controlling the device to recommend content from content available to the user, comprising:

means for computing a first similarity value based on a similarity between the long-term preference attributes of the user and the short-term preference attributes of the user, the first similarity value indicating how similar the long-term preference attributes are to the short-term preference attributes;

means for determining whether the first similarity value is below a reference value; and means for, when it is determined that the first similarity value is below the reference value:

generating weight information for recommending the content to the user based on performing a mathematical operation on the first similarity value and a predetermined weight value weighting attributes of the short-term preference attributes that are dissimilar to corresponding attributes of the long-term preference attributes more heavily than attributes of the short-term preference attributes that are similar to corresponding attributes of the long-term preference attributes;

computing a second similarity value based on a similarity between the short-term preference attributes of the user and corresponding attributes of the content available to the user and on the weight information; and selecting for recommendation the content from the content available to the user based on the second similarity value such that the selected content tends to have attributes that are dissimilar to corresponding attributes of the long-term preference attributes; and means for recommending the selected content to the user, wherein as the user selects content during the second period, the reference value is reduced.

7. The information processing apparatus according to claim 6, wherein the means for controlling the device includes means for estimating a mood of the user based on the weight information.

8. The information processing apparatus according to claim 7, wherein the control means notifies the means for recommending of the estimated mood; and the means for recommending recommends content corresponding to the estimated mood.

9. An information processing method for an information processing apparatus for managing long-term preference attributes of a user and for controlling a device, the method comprising:

generating the long-term preference attributes of the user from attributes of content selected by the user during a first period;

receiving the user's selection of content during a second period that is shorter than the first period;

generating short-term preference attributes of the user from attributes of the content selected by the user during the second period; and controlling the device to recommend content from content available to the user, the controlling including:

computing a first similarity value based on a similarity between the long-term preference attributes and the short-term preference attributes, the first similarity value indicating how similar the long-term preference attributes are to the short-term preference attributes;

determining whether the first similarity value is below a reference value; and when it is determined that the first similarity value is below the reference value:

generating weight information for recommending the content to the user based on performing a mathematical operation on the first similarity value and a predetermined weight value weighting attributes of the short-term preference attributes that are dissimilar to corresponding attributes of the long-term preference attributes more heavily than attributes of the short-term preference attributes that are similar to corresponding attributes of the long-term preference attributes;

computing a second similarity value based on a similarity between the short-term preference attributes of the user and corresponding attributes of the content available to the user and on the weight information; and selecting for recommendation the content from the content available to the user based on the second similarity value such that the selected content tends to have attributes that are dissimilar to corresponding attributes of the long-term preference attributes of the user;

recommending the selected content to the user, and reducing the reference value as the user selects content during the second period.

10. A computer-readable memory device storing a program which, when executed by a processor, causes the processor to perform a method for managing long-term preference attributes of a user and for controller a device, the method comprising:

generating the long-term preference attributes of the user from attributes of content selected by the user during a first period;

receiving the user's selection of content during a second period that is shorter than the first period;

generating short-term preference attributes of the user from attributes of the content selected by the user during the second period; and controlling the device to recommend content from content available to the user, the controlling comprising:

computing a first similarity value based on a similarity between the long-term preference attributes and the short-term preference attributes, the first similarity value indicating how similar the long-term preference attributes are to the short-term preference attributes;

determining whether the first similarity value is below a reference value; and when it is determined that the first similarity value is below the reference value:

generating weight information for recommending the content to the user based on performing a mathematical operation on the first similarity value and a predetermined weight value weighting attributes of the short-term preference attributes that are dissimilar to corresponding attributes of the long-term preference attributes more heavily than attributes of the short-term preference attributes that are similar to corresponding attributes of the long-term preference attributes;

computing a second similarity value based on a similarity between the short-term preference attributes of the user and corresponding attributes of the content available to the user and on the weight information; and selecting for recommendation the content from the content available to the user based on the second similarity value such that the selected content tends to have attributes that are dissimilar to corresponding attributes of the long-term preference attributes of the user;

recommending the selected content to the user, and reducing the reference value as the user selects content during the second period.

11. An information processing apparatus for managing long-term preference attributes of a user, comprising:

a memory storing:

a long-term preference attributes generation section for generating the long-term preference attributes of the user from attributes of content selected by the user during a first period;

a user input section for receiving the user's selection of content during a second period that is shorter than the first period;

a short-term preference attributes generation section for generating short-term preference attributes of the user from attributes of content selected by the user during the second period; and a control section for controlling the device to recommend content from content available to the user, comprising:

a similarity computing section for computing a first similarity value based on a similarity between the long-term preference attributes and the short-term preference attributes, the first similarity value indicating how similar the long-term preference attributes are to the short-term preference attributes;

a determination section for determining whether the first similarity value is below a reference value; and a recommendation control section for, when it is determined that the first similarity value is below the reference value:

generating weight information for recommending the content to the user based on performing a mathematical operation on the first similarity value and a predetermined weight value weighting attributes of the short-term preference attributes that are dissimilar to corresponding attributes of the long-term preference attributes more heavily than attributes of the short-term preference attributes that are similar to corresponding attributes of the long-term preference attributes;

computing a second similarity value based on a similarity between the short-term preference attributes of the user and corresponding attributes of the content available to the user and on the weight information; and selecting for recommendation the content from the content available to the user based on the second similarity value such that the selected content tends to have attributes that are dissimilar to corresponding attributes of the long-term preference attributes; and recommending the selected content to the user; and a processor configured to execute the sections stored in the memory, wherein as the user selects content during the second period, the reference value is reduced.

12. An information processing apparatus for managing long-term preference attributes of a user and for controlling a device, comprising:

a memory storing:

a long-term preference attributes generation section for generating the long-term preference attributes of the user from attributes of content selected by the user during a first period;

a user input section for receiving the user's selection of content during a second period that is shorter than the first period;

a short-term preference attributes generation section for generating short-term preference attributes of the user from attributes of content selected by the user during the second period; and a control section for controlling the device to recommend content from content available to the user, comprising:

a similarity computing section for computing a first similarity value based on a similarity between the long-term preference attributes of the user and the short-term preference attributes of the user, the first similarity value indicating how similar the long-term preference attributes are to the short-term preference attributes;

a determination section for determining whether the first similarity value is below a reference value; and a recommendation control section for, when it is determined that the first similarity value is below the reference value:

generating weight information for recommending content to the user based on performing a mathematical operation on the first similarity value and a predetermined weight value weighting attributes of the short-term preference attributes that are dissimilar to corresponding attributes of the long-term preference attributes more heavily than attributes of the short-term preference attributes that are similar to corresponding attributes of the long-term preference attributes;

computing a second similarity value based on a similarity between the short-term preference attributes and corresponding attributes of the content available to the user and on the weight information;

selecting for recommendation the content from the content available to the user based on the second similarity value such that the selected content tends to have attributes that are dissimilar to corresponding attributes of the long-term preference attributes; and recommending the selected content to the user; and a processor configured to execute the sections stored in the memory, wherein as the user selects content during the second period, the reference value is reduced.

* * * * *